United States Patent
Deng

(10) Patent No.: US 11,272,399 B2
(45) Date of Patent: Mar. 8, 2022

(54) DATA PROCESSING METHOD, MOBILITY MANAGEMENT DEVICE, AND TERMINAL DEVICE

(71) Applicant: HUAWEI TECHNOLOGIES CO., LTD., Guangdong (CN)

(72) Inventor: Qiang Deng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 54 days.

(21) Appl. No.: 16/746,088

(22) Filed: Jan. 17, 2020

(65) Prior Publication Data

US 2020/0154317 A1    May 14, 2020

Related U.S. Application Data

(63) Continuation of application No. PCT/CN2018/093997, filed on Jul. 2, 2018.

(30) Foreign Application Priority Data

Jul. 19, 2017   (CN) .......................... 201710592127.0

(51) Int. Cl.
   *H04W 28/10*   (2009.01)
   *H04W 28/02*   (2009.01)

(52) U.S. Cl.
   CPC ....... *H04W 28/10* (2013.01); *H04W 28/0284* (2013.01)

(58) Field of Classification Search
   None
   See application file for complete search history.

(56) References Cited

U.S. PATENT DOCUMENTS

| | | | |
|---|---|---|---|
| 8,977,227 B2 * | 3/2015 | Tiwari | H04W 4/90 455/404.1 |
| 9,622,018 B2 | 4/2017 | Zhao et al. | |

(Continued)

FOREIGN PATENT DOCUMENTS

| | | |
|---|---|---|
| CN | 101039506 A | 9/2007 |
| CN | 101047982 A | 10/2007 |

(Continued)

OTHER PUBLICATIONS

Chinese Office Action Chinese Application No. 201710592127.0 dated Feb. 1, 2021, 5 pages.

(Continued)

*Primary Examiner* — Tri H Phan

(57) ABSTRACT

A data processing method and apparatus, and a terminal device are described. The method includes: receiving, by a mobility management device, uplink data sent by a terminal device by using a NAS message, and determining, based on a processing capability of the mobility management device, whether the mobility management device is overloaded; and when the mobility management device is overloaded, instructing, by the mobility management device, the terminal device to transmit the uplink data through a user plane. The data processing method and apparatus may improve communication quality, especially when a bearer between the mobility management device and a service device is not set up, the bearer does not need to be first set up and then released, saving signaling and resources.

20 Claims, 23 Drawing Sheets

(56) References Cited

U.S. PATENT DOCUMENTS

| | | | |
|---|---|---|---|
| 9,648,515 B2* | 5/2017 | Velev | H04W 28/12 |
| 10,178,678 B2* | 1/2019 | Watfa | H04W 72/0486 |
| 10,805,036 B2* | 10/2020 | Ronneke | H04W 4/70 |
| 2013/0077484 A1 | 3/2013 | Zhao et al. | |
| 2015/0181462 A1 | 6/2015 | Iwai et al. | |
| 2018/0212710 A1* | 7/2018 | Ronneke | H04W 88/16 |
| 2021/0084528 A1* | 3/2021 | Kim | H04W 76/22 |

FOREIGN PATENT DOCUMENTS

| | | | |
|---|---|---|---|
| CN | 102056112 A | 5/2011 | |
| CN | 102387495 A | 3/2012 | |
| CN | 103889009 A | 6/2014 | |
| CN | 106961653 A | 7/2017 | |
| EP | 2605606 A2 | 6/2013 | |
| EP | 2 876 927 A1 | 5/2015 | |

OTHER PUBLICATIONS

Chinese Search Report Application No. 2017105921270 dated Jan. 20, 2021, 2 pages.

Intel, "CN Overload Control for Control Plane Only PDN Connection", SA WG2 Meeting #117, S2-165567, Oct. 17-21, 2016, Kaohsiung, Taiwan, total 6 pages.

Supplementary European Search Report, European Application No. 1883588 dated Jul. 4, 2020, 9 pages.

International Search Report for PCT/CN2018/093997 dated Sep. 27, 2018, 4 pages.

\* cited by examiner

DATA PROCESSING METHOD, MOBILITY MANAGEMENT DEVICE, AND TERMINAL DEVICE

CROSS-REFERENCE TO RELATED APPLICATIONS

This application is a continuation of International Application No. PCT/CN2018/093997, filed on Jul. 2, 2018, which claims priority to Chinese Patent Application No. 201710592127.0, filed on Jul. 19, 2017. The disclosures of the aforementioned applications are hereby incorporated by reference in their entireties.

TECHNICAL FIELD

Embodiments of the present invention relate to communications technologies, and in particular, to a data processing method, a mobility management device, and a terminal device.

BACKGROUND

Various standards exist in current communication, for example, 2nd generation (2G), 3rd generation (3G), and 4th generation (4G) communications systems, and a new radio access network, for example, a global system for mobile communications (GSM), a code division multiple access (CDMA) system, a time division multiple access (TDMA) system, a wideband code division multiple access (WCDMA), a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, a universal mobile telecommunications system (UMTS), and other communications systems of this type. The new radio access network can provide a transmission rate higher than that of an LTE network. The new radio access network is also referred to as a 5G network, a next generation network, and the like.

FIG. 1 is a schematic structural diagram of a UMTS communications system in the prior art. The UMTS is a 3rd generation mobile communications system using a WCDMA air interface technology and using a structure similar to a 2nd generation mobile communications system. The UMTS system is usually referred to as a WCDMA communications system.

The UMTS system includes a radio access network (RAN) and a core network (CN). The RAN is used to process all functions related to radio, and the CN is used to process all voice calls and data connections in the UMTS system and implement a switching and routing function with an external network. The CN is logically divided into a circuit switched domain (CS) and a packet switched domain (PS).

The CN includes various network elements, for example, a mobile switching center (MSC)/visitor location register (VLR), a serving general packet radio service support node (Serving GPRS Support Node, SGSN), a home location register (HLR), a gateway mobile-service switching center, and a gateway GPRS support node (GGSN, GMSC) network. The CN may be connected to an external network through the GMSC or the GGSN. For example, the CN may be connected to a public land mobile network (PLMN), a public switched telephone network (PSTN), an integrated services digital network (ISDN), and the like through the GMSC and connected to an Internet through the GGSN.

An interface between user equipment (UE) and a universal terrestrial radio access network (UTRAN) is a Uu interface. A Node B is connected to a radio network controller (RNC) through an Iub interface. In the UTRAN, radio network controllers (RNC) are interconnected through Iurs, and the Iurs may be connected through a direct physical connection between the RNCs or may be connected through a transport network. An interface between the UTRAN and the CN is collectively referred to as an Iu interface, including an Iu-CS interface and an Iu-PS interface.

The NodeB is connected to the RNC through the Iub interface, to complete processing of a Uu interface physical layer protocol, allocate and control a radio resource of the NodeB connected or related to the NodeB, and complete conversion of a data flow between the Iub interface and the Uu interface.

The RNC is configured to control a radio resource of the UTRAN, and mainly completes functions of connection setup and disconnection, switchover, macro diversity combining, radio resource management and control, and the like.

To maintain a competitive capability of a future network, 3rd generation partnership project (3GPP) provides a radically new evolved network architecture, to satisfy an application requirement of a mobile network for ten years into the future and even longer. The application requirement includes a system architecture evolution (SAE) and LTE of an access network. The evolved access network is referred to as an evolved universal terrestrial radio access network (E-UTRAN). An objective of the network evolution is to provide a total IP-based network with a low latency, a high data rate, a high system capacity and coverage, and a low cost.

FIG. 2 is a schematic diagram of an evolved packet core network architecture in the prior art. The evolved packet core network may include three logical functional entities: a mobility management entity (MME), a serving gateway (S-GW), and a packet data network gateway (PDN (Packet Data Network) Gateway, P-GW).

The MME is responsible for mobility management of a control plane, including user context and mobile state management, allocation of a temporary user identity, and the like, and corresponding to a control plane part of the serving GPRS support node SGSN in a current GPRS/UMTS system.

The S-GW is responsible for initiating, in an idle state, paging for downlink data, managing and storing an IP bearer parameter and network inner routing information, and the like, and corresponds to a data plane part of the SGSN and the gateway GPRS support node (GGSN) network in the current GPRS/UMTS system.

The P-GW is used as a user plane anchor between different access systems.

A home network server (Home subscriber server, HSS) is configured to store user subscription information.

The SGSN mainly completes functions such as route forwarding of a data packet, mobility management, session management, logical link management, authentication and encryption, and bill generation and output. The SGSN is connected to a GERAN network BSC through a Gb interface, or connected to an UTRAN network RNC through an Iu-PS interface, to perform mobile data management, such as functions of user identification, encryption, compressing, and the like.

A policy and charging rules function (PCRF) entity is used for policy control decision and flow charging control functions.

The MME is connected to an eNB of the E-UTRAN through an S1-MME interface, the MME is connected to a serving gateway through an S11 Interface, and the serving gateway is connected to a PDN Gateway through an S5 interface.

The Internet of Things (IoT) is a network that is of an information carrier such as the Internet or a conventional telecommunications network and that implements interworking between all common objects that can implement individual functions. A core and basis of the Internet of Things are still the Internet. The Internet of Things is a network extending and expanding based on the Internet, and a client of the Internet of Things extends and expands between any object and an object, to perform message interchange and communication. For example, a message of an IoT device such as a water meter and a power meter may be non-frequently sent to a communications network.

The Internet of Things digitizes the real world, and has a wide application range. The Internet of Things integrates dispersed information and integrates digital information between objects. The application field of the Internet of Things mainly includes the following aspects: a transport and logistics field, a health care field, an intelligent environment (home, office, and factory) field, a personal and social field, and the like, and the Internet of Things has a broad market and application foreground.

For a non-frequent and small data transmission characteristic of the IoT device such as the water meter and the power meter, the 3GPP defines a data transmission method by using a non-access stratum (NAS) message. FIG. 3 is a schematic flowchart of a data processing method in the prior art.

Step 301. A radio resource control (RRC) connection is set up between UE in an EMC idle state and an eNB, and the UE sends uplink data to the eNB by using the NAS message in an RRC connection setup process.

When the UE and an MME do not have a NAS signaling connection, that is, a dedicated S1 connection is not set up, the UE is in an EPS connection management (ECM) idle (ECM Idle) state. The UE in the ECM idle state and the eNB set up an RRC connection (RRC connection establishment), and the UE sends an RRC connection setup request to the eNB, where the RRC connection setup request carries a NAS data protocol data unit (NAS DATA PDU). The NAS DATA PDU carries the uplink data and an evolved data system bearer identifier (EPS (Evolved Packet System) Bearer ID, EBI), where the NAS DATA PDU is a type of the NAS message and is control plane data.

Step 302. The eNB sends an initial UE message to the MME through an S1-MME interface.

For example, the initial UE message carries the NAS DATA PDU, where the NAS DATA PDU carries the uplink data and the EBI.

Step 303. The MME performs integrity detection and decrypts the uplink data.

Optionally, in some cases, step 304 to 307 are further performed. Otherwise, step 308 is directly performed after step 303 is performed.

Step 304. The MME sends a modify bearer request to the S-GW.

For example, when a location of the UE changes or a tunnel identifier changes, the MME sends the modify bearer request to the S-GW. If the tunnel identifier of the MME changes, step 307 is directly performed after step 304. If the location of the UE changes, step 305 to 307 are performed after step 304.

Step 305. The S-GW sends the modify bearer request to a P-GW.

Step 306. The P-GW sends a modify bearer response to the S-GW.

Step 307. The S-GW sends the modify bearer response to the MME.

Step 308. The MME sends uplink data to the P-GW through the S-GW.

Optionally, if downlink data exists, step 308 to 313 further need to be performed.

Step 308. The P-GW sends downlink data to the MME through the S-GW.

Step 310. The MME performs encryption and integrity protection on the downlink data.

Step 311. The MME sends the downlink data to the eNB through the S1-MME interface between the eNB and the MME.

Optionally, after the sending of the downlink data is completed, step 311' is performed.

Step 311'. The MME sends a context release command to the eNB through the S1-MME interface.

Step 312. The eNB sends the downlink data to the UE through the NAS Data PDU.

For example, the eNB sends an RRC message to the UE, where the RRC message carries the NAS data PDU, and the NAS data PDU carries the downlink data and an EBI.

Step 313. Activate and detect the MME.

Step 314. A release process of the S1-MME interface between the eNB and the MME.

In the foregoing processes, the UE adds the uplink data to the NAS message and sends the uplink data to the MME, the MME sends the data to the S-GW through the S11 interface between the MME and the S-GW, the S-GW sends the data to the P-GW through an S5/S8 interface. The data transmission is referred to as a control plane data transmission method, and is different from a conventional data transmission method through a user plane. The user plane transmission method is that the UE transmits the data to the eNB through an air interface bearer, and the eNB transmits the data to the S-GW through the S1-U interface between the eNB and the SGW.

However, when the uplink data is transmitted through the control plane, since there may be a large quantity of IoT devices, the large quantity of IoT devices transmitting the data through the NAS may bring additional signaling load for the MME. Therefore, when the MME is overloaded, an appropriate control mechanism and an appropriate data processing method are required.

In the prior art, when it is determined that the MME is overloaded, for example, when the MME determines that a quantity of data that needs to be processed or that a quantity of the IoT devices is greater than or equal to a threshold, the MME first sends, through the control plane, an uplink NAS data packet currently carrying the uplink data, then converts the control plane transmission into the user plane transmission, to send the uplink data, and the MME sends a back-off timer to the UE. The back-off timer is used to instruct the UE not to send the NAS message any more in a time segment specified by the timer.

However, when the MME is overloaded, the MME needs to first send the uplink NAS data packet currently carrying the uplink data, to the S-GW through the control plane. If the S11-U bearer between the eNB and the MME has been set up, the MME sends the uplink NAS data packet currently carrying the uplink data and then releases the S11-U. If the S11-U bearer between the eNB and the MME is not set up, the MME needs to first set up the S11-U bearer, then sends, through the setup S11-U bearer, the uplink NAS data packet currently carrying the uplink data, and then releases the S11-U bearer.

Therefore, in the prior art, when the MME is overloaded, an uplink NAS data packet that is not processed currently and that carries the uplink data is transmitted. When the S11-U bearer does not exist, the S11-U bearer first needs to be set up, then the uplink NAS data packet that is not processed is transmitted to the S-GW, and then the S11-U bearer is released, causing signaling waste. When the S11-U bearer exists and the MME is overloaded, the uplink NAS data packet that is not processed further needs to be transmitted to the S-GW, affecting communication quality.

SUMMARY

A plurality of aspects of the present disclosure provide a data processing method and apparatus, and a terminal device, so that service transmission quality can be ensured and reliability can be improved.

A first aspect of the present disclosure provides a data processing method, including: receiving, by a mobility management device, uplink data sent by a terminal device by using a NAS message, and determining, based on a processing capability of the mobility management device, whether the mobility management device is overloaded; and when the mobility management device is overloaded, instructing, by the mobility management device, the terminal device to transmit the uplink data through a user plane.

Optionally, the mobility management device instructs the terminal device to retransmit, through the user plane, uplink data that is received by the mobility management device from the terminal device through a control plane but that is not sent to a service device when the mobility management device is overloaded.

Optionally, the mobility management device sends uplink data that is received from the terminal device through a control plane but that is not sent to a service device when the mobility management device is overloaded, to the service device through a signaling message.

Optionally, the signaling message includes a modify bearer request message.

Optionally, if the mobility management device has set up a user plane bearer with a service device and the mobility management device has received downlink data from the service device, the mobility management device sends downlink data that is not sent when the mobility management device is overloaded, to the terminal device by using the NAS message.

Optionally, that the mobility management device sends downlink data that is not sent when the mobility management device is overloaded, to the terminal device by using the NAS message specifically includes: carrying, by the mobility management device through an initial context setup request, the downlink data and sending the downlink data to an access network device, where the downlink data is then sent by the access network device to the terminal device through a radio bearer setup complete message.

Optionally, if the mobility management device has set up a user plane bearer with a service device and the mobility management device has received downlink data from the service device, the mobility management device sends a back-off timer and downlink data that is not sent when the mobility management device is overloaded, to the terminal device by using the NAS message.

Optionally, that the mobility management device sends a back-off timer and downlink data that is not sent when the mobility management device is overloaded, to the terminal device by using the NAS message specifically includes: carrying, by the mobility management device by using the NAS message, the back-off timer and the downlink data, and sending the back-off timer and the downlink data to an access network device, where the back-off timer and the downlink data are then sent by the access network device to the terminal device through an RRC downlink message.

A second aspect of the present disclosure provides a data processing method, including: sending, by a terminal device, uplink data to a mobility management device by using a NAS message; receiving, by the terminal device, a notification that is sent when the mobility management device determines, based on a processing capability of the mobility management device, that the mobility management device is overloaded and that is of transmitting the uplink data through a user plane; and sending, by the terminal device, the uplink data to the mobility management device based on the notification through the user plane.

Optionally, the terminal device receives a retransmission instruction sent by the mobility management device, where the retransmission instruction is used to instruct the terminal device to retransmit, through the user plane, uplink data that is received by the mobility management device from the terminal device through a control plane but that is not sent to a service device when the mobility management device is overloaded; and the terminal device retransmits, based on the retransmission instruction through the user plane, the uplink data that is received by the mobility management device from the terminal device through the control plane but that is not sent to the service device when the mobility management device is overloaded.

Optionally, if the mobility management device has set up a user plane bearer with a service device and the mobility management device has received downlink data from the service device, the terminal device receives downlink data that is sent by the mobility management device by using the NAS message and that is not sent when the mobility management device is overloaded.

Optionally, if the mobility management device has set up a user plane bearer with a service device and the mobility management device has received downlink data from the service device, the terminal device receives a back-off timer and downlink data that is not sent when the mobility management device is overloaded, where the back-off timer and the downlink data are sent by the mobility management device by using the NAS message.

A third aspect of the present disclosure provides a data processing apparatus, including: a receiver, configured to receive uplink data sent by a terminal device by using a NAS message; a processor, configured to determine, based on a processing capability of the processor, whether the processor is overloaded; and a transmitter, configured to: when the processor is overloaded, send a notification to the terminal device, to instruct the terminal device to transmit the uplink data through a user plane.

Optionally, the transmitter is further configured to instruct the terminal device to retransmit, through the user plane, uplink data that is received by the receiver from the terminal device but that is not sent by the transmitter to a service device when the processor is overloaded.

Optionally, the transmitter is further configured to send uplink data that is received by the receiver from the terminal device but that is not sent by the transmitter to a service device when the processor is overloaded, to the service device through a signaling message.

Optionally, the signaling message includes a modify bearer request.

Optionally, if the data processing apparatus has set up a user plane bearer with the service device and the receiver has received downlink data from the service device, the transmitter is further configured to send downlink data that is not sent when the processor is overloaded, to the terminal device by using the NAS message.

Optionally, the transmitter is further configured to: carry, through an initial context setup request, downlink data and send the downlink data to an access network device, where the downlink data is then sent by the access network device to the terminal device through a radio bearer setup complete message.

Optionally, if the data processing apparatus has set up a user plane bearer with a service device and the receiver has received the downlink data from the service device, the transmitter is further configured to send a back-off timer and downlink data that is not sent when the processor is overloaded, to the terminal device by using the NAS message.

Optionally, the transmitter is further configured to: carry, by using the NAS message, the back-off timer and the downlink data and send the back-off timer and the downlink data to an access network device, where the back-off timer and the downlink data are then sent by the access network device to the terminal device through an RRC downlink message.

A fourth aspect of the present disclosure provides a terminal device, including: a transmitter, configured to send uplink data to a mobility management device by using a NAS message; and a receiver, configured to receive a notification that is sent when the mobility management device determines, based on a processing capability of the mobility management device, that the mobility management device is overloaded and that is of transmitting the uplink data through a user plane, where the transmitter is further configured to send the uplink data to the mobility management device based on the notification through the user plane.

Optionally, the receiver is further configured to receive a retransmission instruction sent by the mobility management device, where the retransmission instruction is used to instruct the terminal device to retransmit, through the user plane, uplink data that is received by the mobility management device from the terminal device through a control plane but that is not sent to a service device when the mobility management device is overloaded; and the transmitter is further configured to retransmit, based on the retransmission instruction through the user plane, the uplink data that is received by the mobility management device from the terminal device through the control plane but that is not sent to the service device when the mobility management device is overloaded.

Optionally, if the mobility management device has set up a user plane bearer with a service device and the mobility management device has received downlink data from the service device, the receiver is further configured to receive downlink data that is sent by the mobility management device by using the NAS message and that is not sent when the mobility management device is overloaded.

Optionally, if the mobility management device has set up a user plane bearer with a service device and the mobility management device has received downlink data from the service device, the receiver is further configured to receive a back-off timer and downlink data that is not sent when the mobility management device is overloaded, where the back-off timer and the downlink data are sent by the mobility management device by using the NAS message.

A fifth aspect of the present disclosure provides a data processing apparatus, including a processor, a memory, and a transceiver, where the memory is configured to store an instruction, the processor is configured to execute the instruction stored in the memory, to control the transceiver to receive and transmit a signal, and when the processor executes the instruction stored in the memory, the data processing apparatus is configured to complete the method according to the first aspect.

A sixth aspect of the present disclosure provides a data processing apparatus, including a processor, a memory, and a transceiver, where the memory is configured to store an instruction, the processor is configured to execute the instruction stored in the memory, to control the transceiver to receive and transmit a signal, and when the processor executes the instruction stored in the memory, the data processing apparatus is configured to complete the method according to the second aspect.

The data processing method and apparatus, and the terminal device that are described above can ensure service transmission quality while improving reliability.

DESCRIPTION OF EMBODIMENTS

Figure 1:
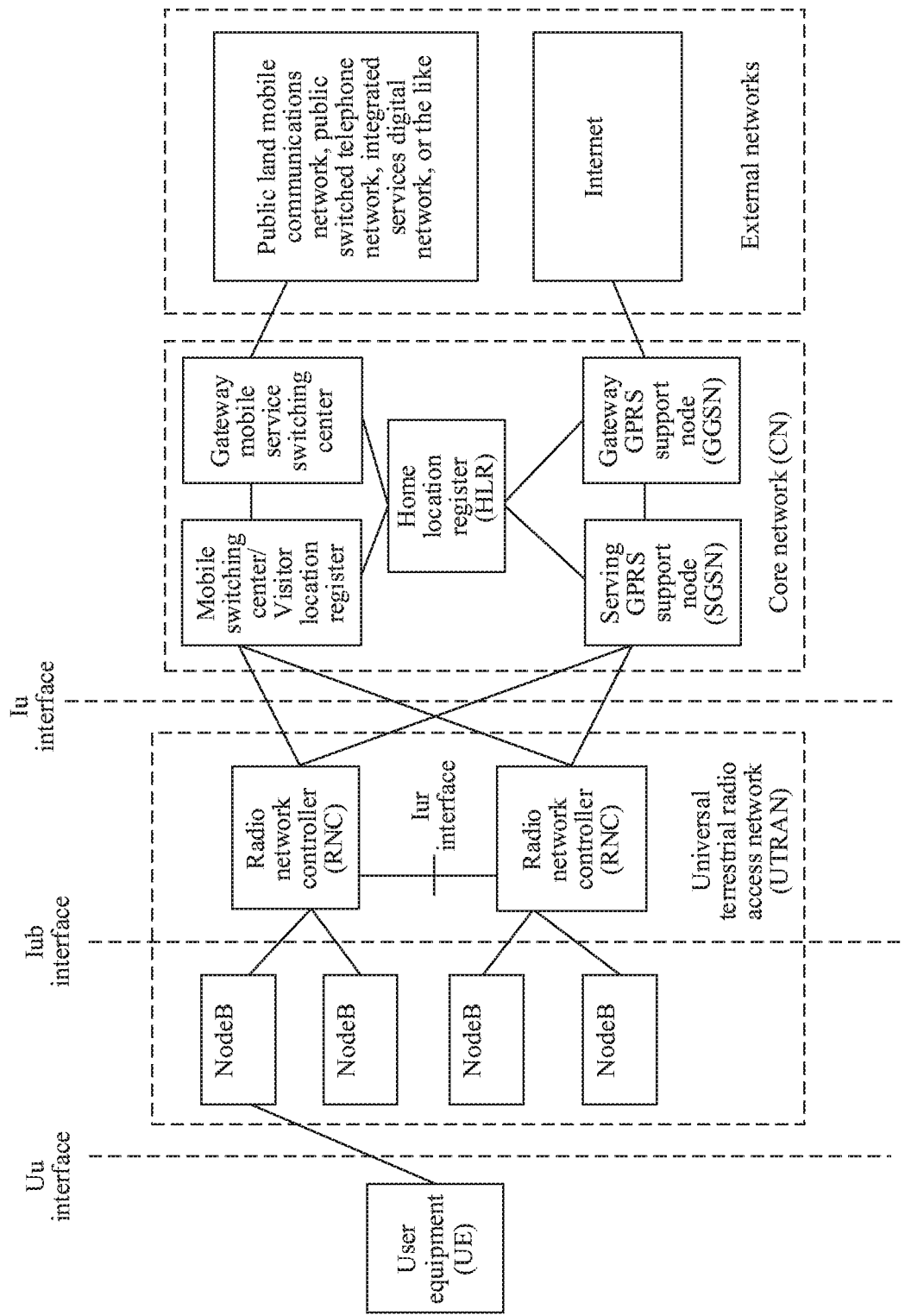
FIG. 1 is a schematic structural diagram of a UMTS communications system in the prior art.
Figure 2:
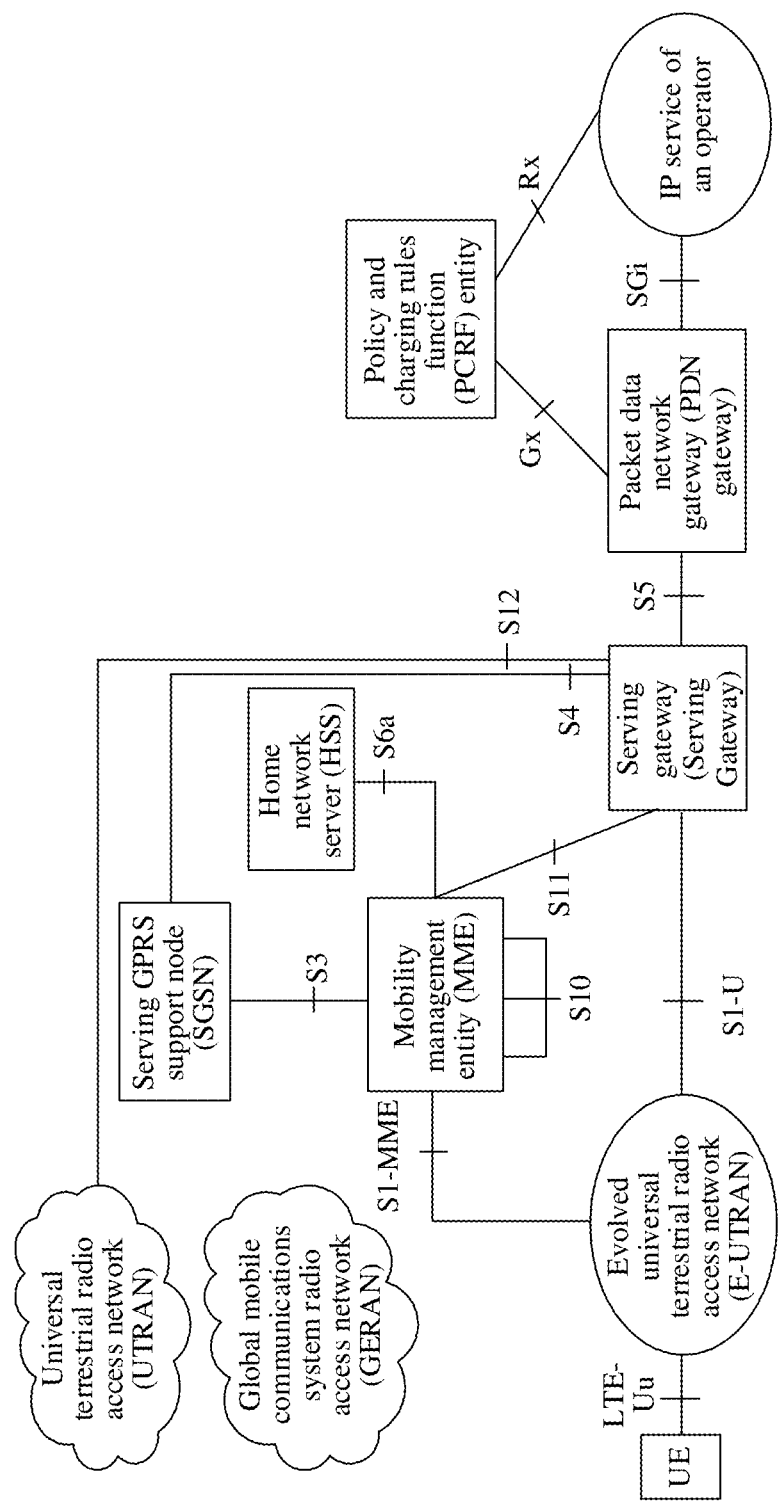
FIG. 2 is a schematic diagram of an evolved packet core network architecture in the prior art.
Figure 3:
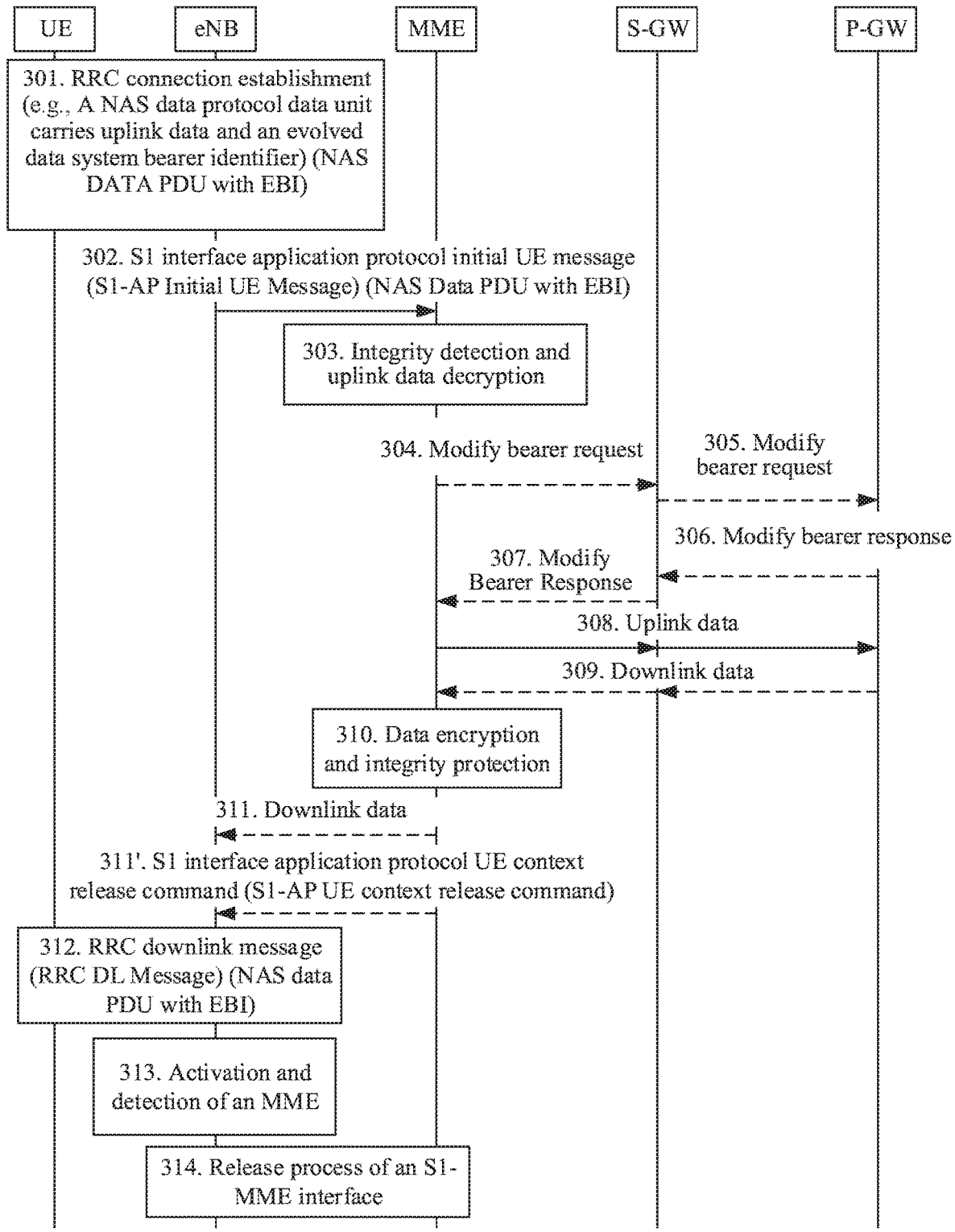
FIG. 3 is a schematic flowchart of a data processing method in the prior art.

To make the objectives, technical solutions, and advantages of the embodiments of the present invention clearer, the following describes the technical solutions in certain embodiments of the present invention with reference to the accompanying drawings. The described embodiments are some but not all of the embodiments of the present invention. All other embodiments obtained by a person of ordinary skill in the art based on the description of embodiments in the present disclosure without creative efforts shall fall within the protection scope of the present disclosure.

In the specification, the terms "first", "second", and the like are not intended to indicate any order, quantity, or significance, but are intended to distinguish between different components. Likewise, "a/an", "one", or the like is not intended to indicate a quantity limitation either, but is intended to indicate that at least one exists. "Connection", "link" or the like is not limited to a physical or mechanical connection, but may include an electrical connection, whether directly or indirectly.

A "module" mentioned in this specification usually refers to a program or an instruction that is stored in a memory and that can implement some functions. A "unit" mentioned in this specification usually refers to a functional structure divided according to logic. The "unit" may be implemented by only hardware, or implemented by a combination of software and hardware.

In this specification, "a plurality of" refers to two or more than two. The term "and/or" describes an association relationship of associated objects and represents that three relationships may exist. For example, A and/or B may represent the following three cases: Only A exists, both A and B exist, and only B exists. The character "/" generally indicates an "or" relationship between the associated objects.

The technology described in this specification may be applicable to various communications systems, for example, current 2G, 3G, and 4G communications systems and a new radio access network, for example, a GSM system, a CDMA system, a TDMA system, a WCDMA system, an FDMA system, an OFDMA system, an SC-FDMA system, a GPRS system, an LTE system, a UMTS network, a new radio access network, and other communications systems of this type. The new radio access network can provide a transmission rate higher than that of an LTE network. The new radio access network is also referred to as a 5G network, a next generation network, and the like.

Various aspects are described in this specification with reference to a receive end and/or a base station and/or a base station controller.

A terminal device may be a wireless terminal or a wired terminal. The wireless terminal may refer to a device that provides a receive end with voice and/or data connectivity, a handheld device with a radio connection function, or another processing device connected to a radio modem. The wireless terminal may communicate with one or more core networks through a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal, an access terminal, a user terminal, UE or a user agent.

The base station (namely, a node) may be a device that communicates with the wireless terminal over an air interface in an access network by using one or more sectors. The base station may be configured to mutually convert a received over-the-air frame and an Internet Protocol (IP) packet (e.g. convert from an over-the-air frame to an IP packet and vice versa) and serve as a router between the wireless terminal and a remaining portion of the access network, where the remaining portion of the access network may include an IP network. The base station may further coordinate attribute management of the air interface. For example, the base station may be a base transceiver station (BTS) in the GSM system or the CDMA system, a NodeB in the WCDMA system, an evolved NodeB (eNodeB, eNB or e-NodeB) in the LTE system, and an access network device of the new radio access network. This is not limited in this application. The access network device of the new radio access network is also referred to as a gNB, an NR node (node), or an NR BS (base station). This is not limited herein, but for the purpose of convenient description, the access network device is sometimes collectively referred to as the gNB in this specification.

The base station controller (that is, a control node) may be a base station controller (BSC) in the GSM system or the CDMA system, or a radio network controller (RNC) in the WCDMA. This is not limited in this application.

Figure 4:
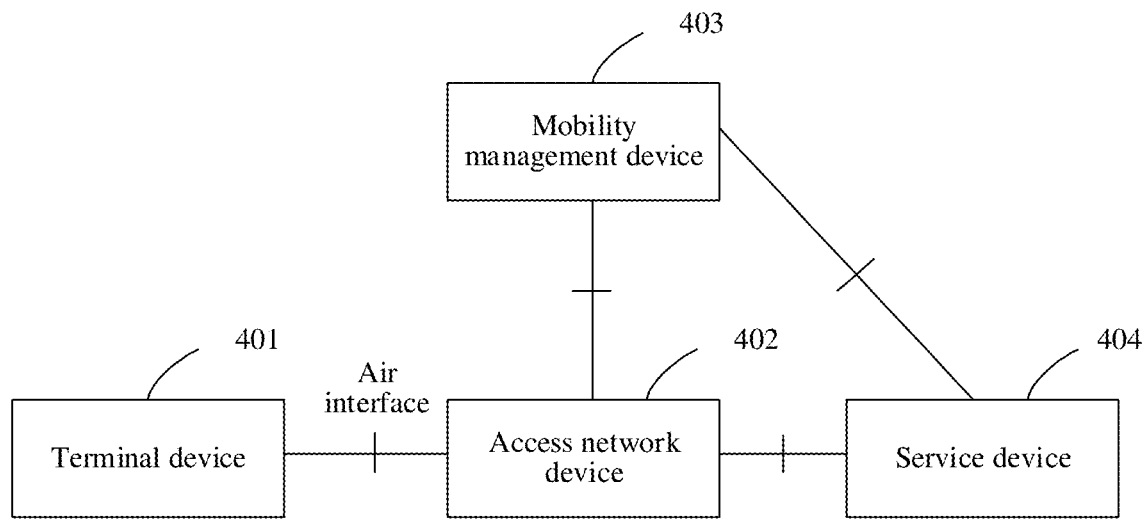
FIG. 4 is a schematic structural diagram of a communications system according to an embodiment of the present invention.

FIG. 4 is a schematic structural diagram of a communications system according to an embodiment of the present invention. The communications system may be a 2G, 3G, or 4G communications system or a new radio access network, for example, a GSM system, a CDMA system, a TDMA system, a WCDMA system, an FDMA system, an OFDMA system, an SC-FDMA system, a GPRS system, an LTE system, a UMTS network, a new radio access network, and other communications systems of this type. The new radio access network is also referred to as a 5G network, a next generation network, and the like.

The communications system may include a terminal device 401, an access network device 402, a mobility management device 403, and a service device 404. The access network device 402 may be a base station in the 2G, 3G, or 4G communications system or a gNB in a 5G communications system. Because standards of the communications systems are different (that is, access technologies are different), terms of devices and terms of interfaces between the devices are also different. For example, in an LTE communications system, the access network device 402 is an eNB, the mobility management device 403 is an MME, and the service device 404 is an S-GW. For another example, in the new radio access network, the access network device 402 is the gNB, and the mobility management device 403 is an access and mobility management function (AMF) entity. The service device 404 includes a session management function (SMF) entity and a user plane function (UPF) entity. A network architecture and an interface of the LTE communications system and the new radio access network are specifically shown in FIG. 5 and FIG. 6.

Figure 5:
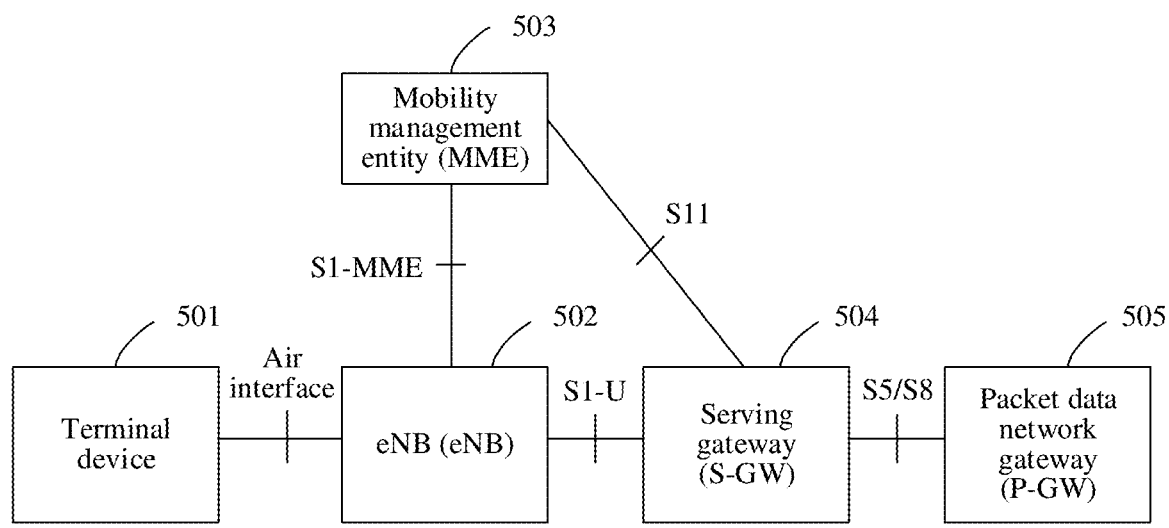
FIG. 5 is a schematic structural diagram of an LTE communications system according to another embodiment of the present invention.

FIG. 5 is a schematic structural diagram of an LTE communications system according to another embodiment of the present invention. The LTE communications system may include a terminal device 501, an eNB 502, an MME 503, an S-GW 504, and a P-GW 505.

The terminal device 501 may be an IoT device such as a water meter and a power meter, and communicates with the eNB 502 through an air interface.

The eNB 502 communicates with the MME 503 through an S1-MME interface, the eNB 502 communicates with the S-GW 504 through an S1-U interface, the MME 503 communicates with the S-GW 504 through an S11 Interface, and the S-GW 504 communicates with the P-GW 505 through an S5 or S8 (S5/S8) interface.

Figure 6:
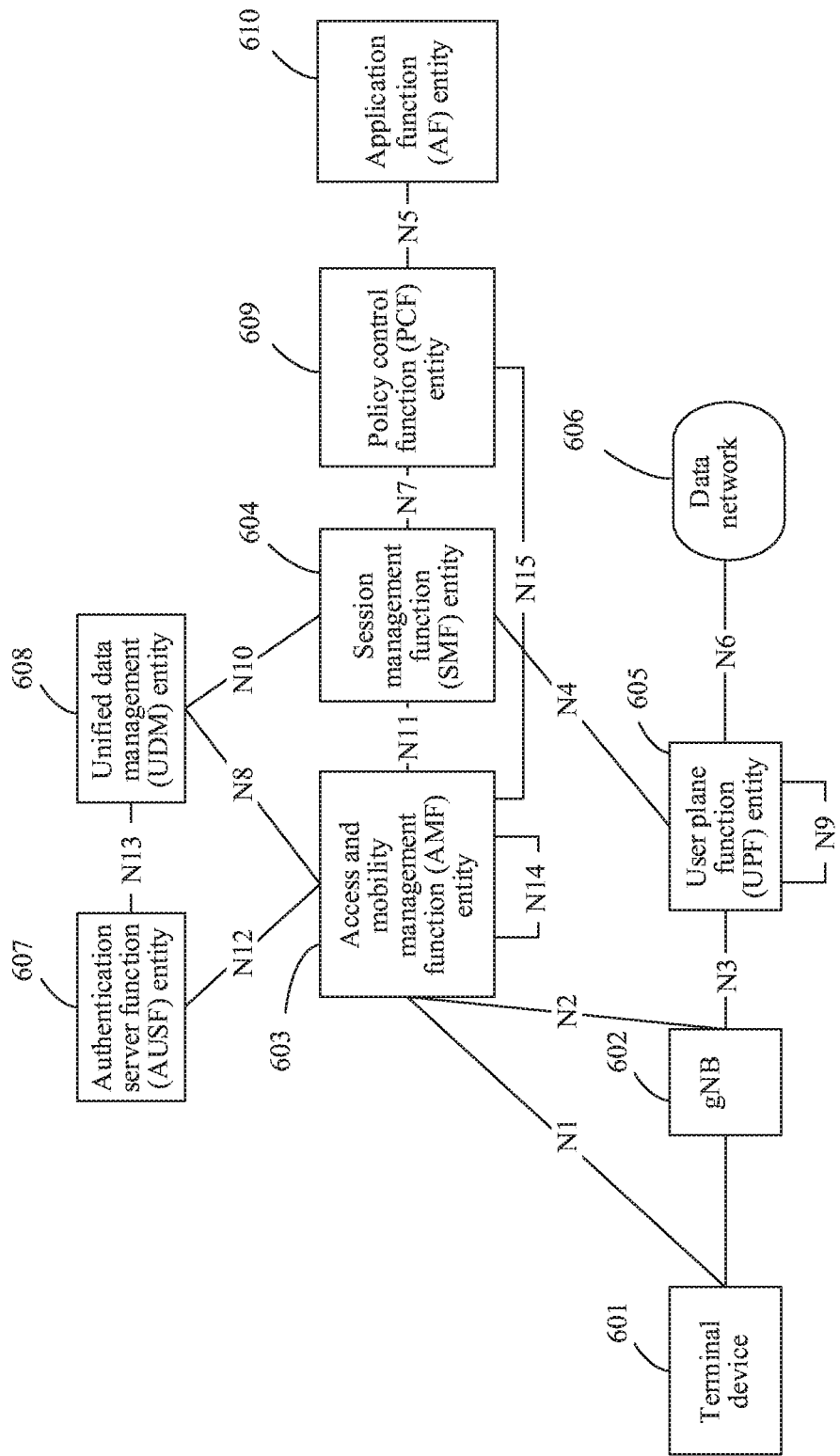
FIG. 6 is a schematic structural diagram of a new radio access network according to another embodiment of the present invention.

FIG. 6 is a schematic structural diagram of a new radio access network according to another embodiment of the present invention. The new radio access network is also referred to as a 5G network, a next generation network, and the like. The new radio access network may include a terminal device 601, a gNB 602, an AMF entity 603, an SMF entity 604, a UPF entity 605, a data network (data network, DN) 606, an authentication server function (AUSF) entity 607, a unified data management (UDM) entity 608, a policy control functional (PCF) entity 609, and an application functional (AF) entity 610.

The terminal device 6011 may be an IoT device such as a water meter and a power meter. An interface between the terminal device 601 and the gNB 602 is an air interface, an interface between the terminal device 601 and the AMF 603 is an N1 interface, an interface between the gNB 602 and the AMF 603 is an N2 interface, an interface between the gNB 602 and the UPF 605 is an N3 interface, an interface between the AMF 603 and the SMF 604 is an N11 interface, and an interface between the SMF 604 and the UPF 605 is an N4 interface. Other interfaces are specifically shown in FIG. 6, and details are not described herein again.

Figure 7:
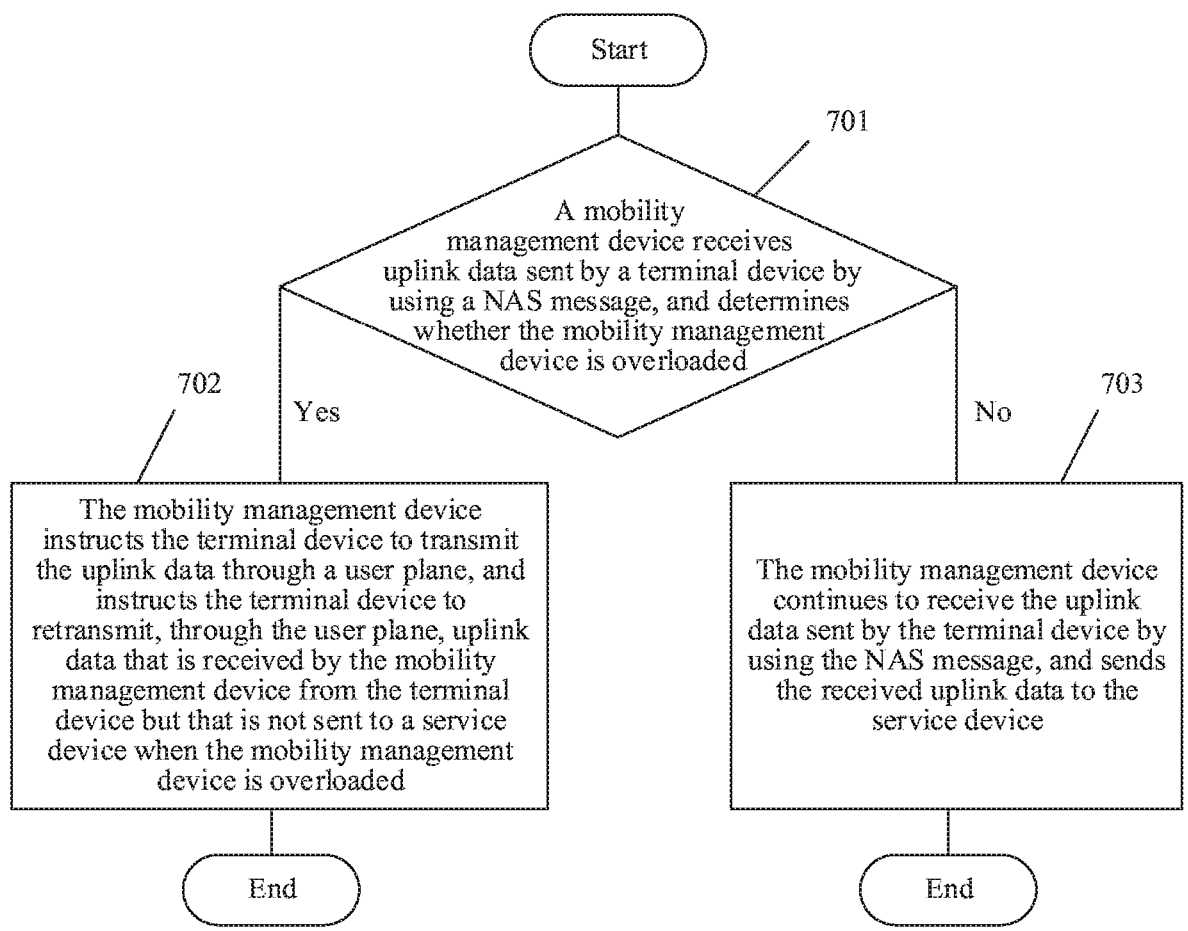
FIG. 7 is a schematic flowchart of a data processing method according to an embodiment.

FIG. 7 is a schematic flowchart of a data processing method according to an embodiment. The data processing method may be applicable to various communications systems, for example, an LTE communications system or a new radio access network. For brevity of description, the data processing method in this embodiment is described by using a network architecture in FIG. 4 as an example, and main processes are described as follows.

Step 701. A mobility management device receives uplink data sent by a terminal device by using a NAS message, and determines, based on a processing capability of the mobility management device, whether the mobility management device is overloaded.

For example, the terminal device sends the NAS message to the mobility management device through an access network device, where the NAS message carries the uplink data, for example, the NAS message is a service request (SR) of a control plane. After receiving the uplink data sent by the terminal device through the service request, the mobility management device determines, based on all data (for example, uplink and/or downlink data) and all signaling (for example, uplink and/or downlink signaling) that are currently received, and a processing capability of the mobility management device, whether the processing capability of the mobility management device reaches a threshold. For example, the mobility management device determines whether a computing resource or a storage resource that has been used by the mobility management device is greater than or equal to a first threshold (for example, equal to a largest value) or the mobility management device determines whether a computing resource or storage resource available to the mobility management device is less than or equal to a second threshold.

For example, when a user plane bearer between the mobility management device and the service device is not set up, the mobility management device determines, based on all the data and control signaling (for example, the uplink data and/or uplink control signaling) that are currently received by the mobility management device, whether the processing capability of the mobility management device reaches the threshold. When the user plane bearer between the mobility management device and the service device has been set up, the mobility management device determines, based on all the data and the control signaling (for example, the uplink data, the uplink control signaling, downlink data and/or downlink control signaling) that are currently received by the mobility management device, whether the processing capability of the mobility management device reaches the threshold.

If the mobility management device determines that the processing capability of the mobility management device reaches the threshold, for example, the mobility management device determines that the computing resource or the storage resource that has been used by the mobility management device is greater than or equal to the first threshold (for example, equal to the largest value) or the mobility management device determines that the computing resource or storage resource available to the mobility management device is less than or equal to the second threshold, it is determined that the mobility management device is overloaded. If the mobility management device determines that the processing capability of the mobility management device does not reach the threshold, for example, the mobility management device determines that the computing resource or the storage resource that has been used by the mobility management device is less than the first threshold (for example, does not reach the largest value) or the mobility management device determines that the computing resource or storage resource available to the mobility management device is greater than the second threshold, it is determined that the mobility management device is not overloaded.

Step 702. When the mobility management device is overloaded, the mobility management device instructs the terminal device to transmit the uplink data through a user plane, and instructs the terminal device to retransmit, through the user plane, uplink data that is received by the mobility management device from the terminal device through a control plane but that is not sent to the service device when the mobility management device is overloaded.

For example, the mobility management device sends the NAS message to the access network device, for example, the NAS message is an initial context setup request (Initial Context Setup Request) or a service accept message (Service Accept message). The NAS message carries a user plane transmission instruction and a retransmission instruction. The access network device sends the user plane transmission instruction and the retransmission instruction to the terminal device. The user plane transmission instruction is used to instruct the terminal device to transmit the uplink data through the user plane. To be specific, the user plane transmission instruction is used to instruct the terminal device to transmit, through the user plane, uplink data that occurs after the uplink data that is received by the mobility management device from the terminal device through the control plane when the mobility management device is overloaded. The retransmission instruction is used to instruct the terminal device to retransmit, through the user plane, the uplink data that is received by the mobility management device from the terminal device through the control plane but that is not sent to the service device when the mobility management device is overloaded. In an embodiment, the NAS message further carries a back-off timer. The back-off timer is used to instruct the terminal device not to send the NAS message in a time segment specified by the back-off timer.

In an embodiment, the user plane transmission instruction, the retransmission instruction, and the back-off timer may be separately carried by different NAS messages or carried by two different NAS messages.

In an embodiment, when the mobility management device is overloaded, the mobility management device discards the uplink data that is received by the mobility management device from the terminal device through the control plane but that is not sent to the service device when the mobility management device is overloaded.

In an embodiment, regardless of whether the user plane bearer is set up between the mobility management device and the service device, the mobility management device discards the uplink data that is received by the mobility management device from the terminal device through the control plane but that is not sent to the service device when the mobility management device is overloaded.

In an embodiment, if the user plane bearer has been set up between the mobility management device and the service device, and the mobility management device receives downlink data from the service device, when it is determined that the mobility management device is overloaded, the mobility management device sends the downlink data to the access network device through NAS signaling. For example, the mobility management device sends an initial context setup request (Initial Context Setup Request) to the access network device. The initial context setup request carries the downlink data. The access network device sends a radio bearer setup complete (Radio bearers setup Complete) message to the terminal device. The radio bearer setup complete message carries the downlink data. In another embodiment, the initial context setup request and the radio bearer setup complete message further carry the back-off timer.

In an embodiment, if the user plane bearer has been set up between the mobility management device and the service device, and the mobility management device receives the downlink data from the service device, when it is determined that the mobility management device is overloaded, the mobility management device sends the back-off timer and the downlink data to the access network device by using the NAS message (for example, a downlink S1-AP message, for example, the downlink S1-AP message is a downlink NAS transport message), and then the access network device sends the back-off timer and the downlink data to the terminal device by using the NAS message (for example, a downlink RRC direct transfer (Downlink RRC direct transfer) message).

Step 703. When the mobility management device is not overloaded, the mobility management device continues to receive the uplink data sent by the terminal device by using the NAS message, and sends the received uplink data to the service device.

In an embodiment, when the back-off timer expires or after the terminal device transmits the uplink data, the terminal device initiates to set up a packet data network (PDN) connection again. After the PDN connection is set up, the terminal device carries the uplink data by using the NAS message and sends the uplink data to the mobility management device. The PDN connection is a connection successively passing through the access network device and an S-GW to a P-GW.

Therefore, in the data processing method described above, when the mobility management device is overloaded, regardless of whether the user plane bearer is set up between the mobility management device and the service device, an uplink NAS data packet that is not processed currently and that carries the uplink data is discarded, and the terminal device is instructed to transmit the uplink data through the user plane and to retransmit, through the user plane, the uplink data that is received by the mobility management device from the terminal device through the control plane but that is not sent to the service device when the mobility management device is overloaded. Therefore, the mobility management device does not need to transmit the uplink data packet that is not processed to the service device when the mobility management device is overloaded, so that communication quality can be improved. Especially, when the bearer between the mobility management device and the service device is not set up, the bearer does not need to be first set up and then released, saving signaling and resources.

Figure 8:
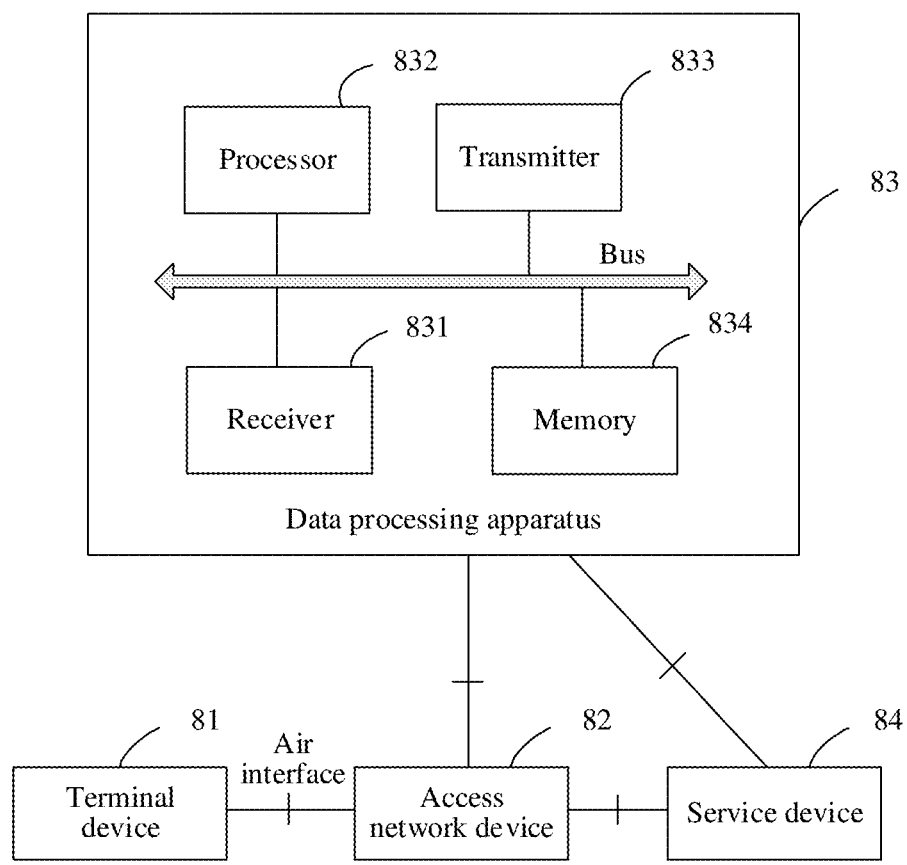
FIG. 8 is a schematic structural diagram of a communications system according to an embodiment.

FIG. 8 is a schematic structural diagram of a communications system according to an embodiment. The communications system may be a 2G, 3G, or 4G communications system or a new radio access network, for example, a GSM system, a CDMA system, a TDMA system, a WCDMA system, an FDMA system, an OFDMA system, an SC-FDMA system, a GPRS system, an LTE system, a UMTS network, a new radio access network, and other communications systems of this type. The new radio access network is also referred to as a 5G network, a next generation network, and the like.

The communications system may include a terminal device 81, an access network device 82, a data processing apparatus 83, and a service device 84. The access network device 82 may be a base station in the 2G, 3G, or 4G communications system or a gNB in a 5G communications system. Because standards of the communications systems are different (that is, access technologies are different), terms of devices and terms of interfaces between the devices are also different. For example, the data processing apparatus 83 may be a mobility management device; in an LTE communications system, the access network device 82 is an eNB, the data processing apparatus 83 is an MME, and the service device 84 is an S-GW. For another example, in the new radio access network, the access network device 82 is the gNB, and the data processing apparatus 83 is an AMF entity. The service device 84 includes an SMF entity and a UPF entity. A network architecture and an interface of the LTE communications system and the new radio access network are specifically shown in FIG. 5 and FIG. 6.

The terminal device 81 may be an IoT device such as a water meter and a power meter.

The data processing apparatus 83 includes: a receiver 831, a processor 832, a transmitter 833, and a memory 834, where the receiver 831, the processor 832, the transmitter 833, and the memory 834 communicate with each other through a bus.

In this embodiment of this application, the processor 832 may be an erasable programmable logic device (EPLD), a field programmable gate array (FPGA), a digital signal processor (DSP) chip, an application-specific integrated circuit (ASIC), another programmable logical device, discrete gate, transistor logical device, discrete hardware component, or the like.

The memory 834 is configured to store a code or instruction information, and may further store information about a device type. The memory 834 may include a read-only memory (ROM) and a random access memory (RAM), to provide an instruction and data for the processor 832. A part of the memory 834 may further include a non-volatile random access memory.

The receiver 831 is configured to receive uplink data sent by a terminal device by using a NAS message.

The processor 832 is configured to determine, based on a processing capability of the mobility management device, whether the mobility management device is overloaded.

For example, the receiver 831 receives the NAS message sent by the terminal device through the access network device 82, where the NAS message carries the uplink data, for example, the NAS message is a control plane service request. After the receiver 831 receives the uplink data sent by the terminal device through the service request, the processor 832 determines, based on all data (for example, uplink data and/or downlink data) and all signaling (for example, uplink and/or downlink signaling) that are currently received, and a processing capability of the processor 832, whether the processing capability of the processor 832 reaches a threshold. For example, the processor 832 determines whether a computing resource or a storage resource that has been used by the processor 832 is greater than or equal to a first threshold (for example, equal to a largest value) or the processor 832 determines whether a computing resource or storage resource available to the processor 832 is less than or equal to a second threshold.

For example, when a user plane bearer between the data processing apparatus 83 and the service device 84 is not set up, the processor 832 determines, based on all the data and control signaling (for example, the uplink data and/or uplink control signaling) that are currently received by the receiver 831, whether the processing capability of the processor 832 reaches the threshold. When the user plane bearer between the data processing apparatus 83 and the service device 84 has been set up, the processor 832 determines, based on all the data and control signaling (for example, the uplink data, the uplink control signaling, downlink data, and/or downlink control signaling) that are currently received by the receiver 831, whether the processing capability of the processor 832 reaches the threshold.

If the processor 832 determines that the processing capability of the processor 832 reaches the threshold, for example, the processor 832 determines that the computing resource or the storage resource that has been used by the processor 832 is greater than or equal to the first threshold (for example, equal to the largest value) or the processor 832 determines that the computing resource or storage resource available to the processor 832 is less than or equal to the second threshold, it is determined that the processor 832 is overloaded. If the processor 832 determines that the processing capability of the processor 832 does not reach the threshold, for example, the processor 832 determines that the computing resource or the storage resource that has been used by the processor 832 is less than the first threshold (for example, does not reach the largest value) or the processor 832 determines that the computing resource or storage resource available to the processor 832 is greater than the second threshold, it is determined that the processor 832 is not overloaded.

The transmitter 833 is configured to: when it is determined that the processor 832 is overloaded, instruct the terminal device to transmit the uplink data through the user plane, and instruct the terminal device to retransmit, through the user plane, uplink data that is received from the terminal device through a control plane but that is not sent to the service device when the processor 832 is overloaded.

For example, the transmitter 833 sends the NAS message to the access network device 82, for example, the NAS message is an initial context setup request or a service accept message. The NAS message carries a user plane transmission instruction and a retransmission instruction. The user plane transmission instruction is used to instruct the terminal device to transmit the uplink data through the user plane. The retransmission instruction is used to instruct the terminal device to retransmit, through the user plane, the uplink data that is received by the mobility management device from the terminal device through the control plane but that is not sent to the service device when the mobility management device is overloaded. In an embodiment, the NAS message further carries a back-off timer. The back-off timer is used to instruct the terminal device not to send the NAS message in a time segment specified by the back-off timer.

In an embodiment, the user plane transmission instruction, the retransmission instruction, and the back-off timer may be separately carried by different NAS messages or carried by two different NAS messages.

In an embodiment, when it is determined that the processor 832 is overloaded, the processor 832 is further configured to determine to discard the uplink data that is received from the terminal device through the control plane but that is not sent to the service device when the processor 832 is overloaded.

In an embodiment, regardless of whether the user plane bearer is set up between the data processing apparatus 83 and the service device 84, the processor 832 determines to discard the uplink data that is received from the terminal device through the control plane but that is not sent to the service device when the processor 832 is overloaded.

In an embodiment, if the user plane bearer has been set up between the data processing apparatus 83 and the service device 84, and the receiver 831 receives downlink data from the service device 84, when it is determined that the processor 832 is overloaded, the transmitter 833 sends the downlink data to the terminal device 81 through a NAS signaling. For example, the transmitter 833 sends an initial context setup request to the access network device 82. The initial context setup request carries the downlink data. The access network device 82 sends a radio bearer setup complete message to the terminal device 81. The radio bearer setup complete message carries the downlink data. In an embodiment, the initial context setup request and the radio bearer setup complete message further carry the back-off timer.

For example, in an embodiment, if the user plane bearer has been set up between the data processing apparatus 83 and the service device 84, and the receiver 831 receives the downlink data from the service device 84, when it is determined that the processor 832 is overloaded, the transmitter 833 sends the back-off timer and the downlink data to the access network device 82 by using the NAS message (for example, a downlink S1-AP message, for example, the downlink S1-AP message is a downlink NAS transport message), and then the access network device 82 sends the back-off timer and the downlink data to the terminal device 81 by using the NAS message (for example, a downlink RRC direct transfer message).

The receiver 831 is further configured to: when it is determined that the processor 832 is not overloaded, continue to receive the uplink data sent by the terminal device by using the NAS message, and the transmitter 833 is further configured to send the received uplink data to the service device 84.

In an embodiment, when the back-off timer expires or after the terminal device 81 transmits the uplink data, the terminal device initiates to set up a PDN connection again. After the PDN connection is set up, the receiver 831 is further configured to receive uplink data carried by the terminal device by using the NAS message.

Figure 9:
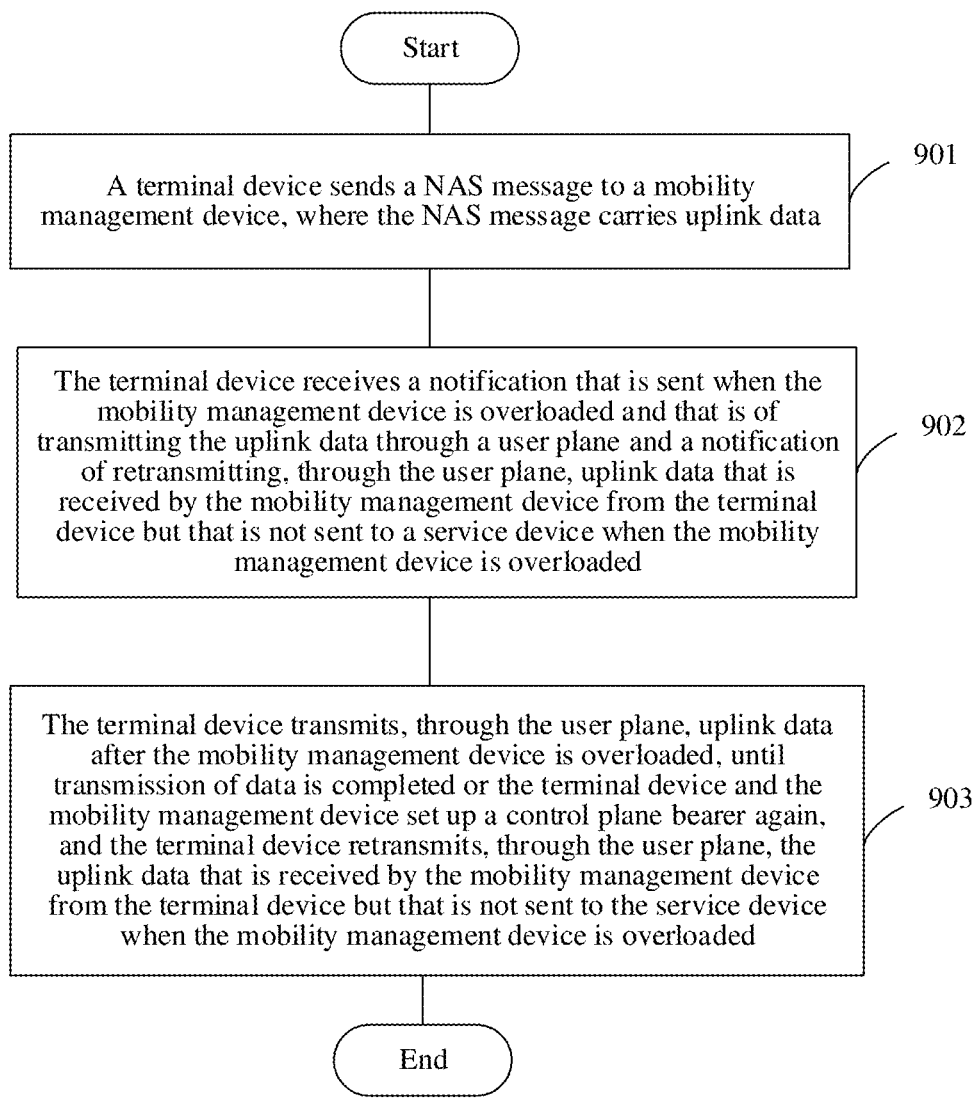
FIG. 9 is a schematic flowchart of a data processing method according to an embodiment.

FIG. 9 is a schematic flowchart of a data processing method according to an embodiment. The data processing method may be applicable to various communications systems, for example, an LTE communications system or a new radio access network. For brevity of description, the data processing method in this embodiment is described by using a network architecture in FIG. 4 as an example, and main processes are described as follows.

Step 901. A terminal device sends a NAS message to a mobility management device, where the NAS message carries uplink data.

For example, the terminal device sends the NAS message to the mobility management device through an access network device, where the NAS message carries the uplink data. For example, the NAS message is a service request (SR) of a control plane.

Step 902. The terminal device receives a notification that is sent when the mobility management device is overloaded and that is of transmitting the uplink data through a user plane and a notification of retransmitting, through the user plane, uplink data that is received by the mobility management device from the terminal device through a control plane but that is not sent to the service device when the mobility management device is overloaded.

The mobility management device receives the uplink data sent by the terminal device by using the NAS message, and determines, based on all data (for example, uplink and/or downlink data) and all signaling (for example, uplink and/or downlink signaling) that are currently received by the mobility management device, and a processing capability of the mobility management device, whether the mobility management device is overloaded.

For example, after receiving the uplink data sent by the terminal device through the service request, the mobility management device determines whether the processing capability of the mobility management device reaches a threshold. For example, the mobility management device determines whether a computing resource or a storage resource that has been used by the mobility management device is greater than or equal to a first threshold (for example, equal to a largest value) or the mobility management device determines whether a computing resource or storage resource available to the mobility management device is less than or equal to a second threshold.

For example, when a user plane bearer between the mobility management device and the service device is not set up, the mobility management device determines, based on all the data and control signaling (for example, the uplink data and/or uplink control signaling) that are currently received by the mobility management device, whether the processing capability of the mobility management device reaches the threshold. When the user plane bearer between the mobility management device and the service device has been set up, the mobility management device determines, based on all the data and the control signaling (for example, the uplink data, the uplink control signaling, downlink data and/or downlink control signaling) that are currently received by the mobility management device, whether the processing capability of the mobility management device reaches the threshold.

If the mobility management device determines that the processing capability of the mobility management device reaches the threshold, for example, the mobility management device determines that the computing resource or the storage resource that has been used by the mobility management device is greater than or equal to the first threshold (for example, equal to the largest value) or the mobility management device determines that the computing resource or storage resource available to the mobility management device is less than or equal to the second threshold, it is determined that the mobility management device is overloaded. If the mobility management device determines that the processing capability of the mobility management device does not reach the threshold, for example, the mobility management device determines that the computing resource or the storage resource that has been used by the mobility management device is less than the first threshold (for example, does not reach the largest value) or the mobility management device determines that the computing resource or storage resource available to the mobility management device is greater than the second threshold, it is determined that the mobility management device is not overloaded.

For example, the terminal device receives the NAS message that is sent when the mobility management device is overloaded, for example, the NAS message is an initial context setup request (Initial Context Setup Request) or a service accept message (Service Accept message). The NAS message carries a user plane transmission instruction and a retransmission instruction. The user plane transmission instruction is used to instruct the terminal device to transmit the uplink data through the user plane. The retransmission instruction is used to instruct the terminal device to retransmit, through the user plane, the uplink data that is received by the mobility management device from the terminal device through the control plane but that is not sent to the service device when the mobility management device is overloaded. In an embodiment, the NAS message further carries a back-off timer. The back-off timer is used to instruct the terminal device not to send the NAS message in a time segment specified by the back-off timer.

In an embodiment, the user plane transmission instruction, the retransmission instruction, and the back-off timer may be separately carried by different NAS messages or carried by two different NAS messages.

In an embodiment, when the mobility management device is overloaded, the mobility management device discards the uplink data that is received by the mobility management device from the terminal device through the control plane but that is not sent to the service device when the mobility management device is overloaded.

In an embodiment, regardless of whether the user plane bearer is set up between the mobility management device and the service device, the mobility management device discards the uplink data that is received by the mobility management device from the terminal device through the control plane but that is not sent to the service device when the mobility management device is overloaded.

In an embodiment, if the user plane bearer has been set up between the mobility management device and the service device, and the mobility management device receives downlink data from the service device, when it is determined that the mobility management device is overloaded, the mobility management device sends the downlink data to the terminal device through a NAS signaling. For example, the mobility management device sends an initial context setup request to the access network device. The initial context setup request carries the downlink data. After sending a radio bearer setup request to the access network device, the terminal device receives a radio bearer setup complete message sent by the access network device. The radio bearer setup complete message carries the downlink data. In an embodiment, the initial context setup request and the radio bearer setup complete message further carry the back-off timer.

For example, in an embodiment, if the user plane bearer has been set up between the mobility management device and the service device, and the mobility management device receives the downlink data from the service device, when it is determined that the mobility management device is overloaded, the mobility management device sends the back-off timer and the downlink data to the access network device by using the NAS message (for example, a downlink S1-AP message, for example, the downlink S1-AP message is a downlink NAS transport message), and then the access network device sends the back-off timer and the downlink data to the terminal device by using the NAS message (for example, a downlink RRC direct transfer message).

Step 903. The terminal device transmits, through the user plane, uplink data after the mobility management device is overloaded, until transmission of uplink data that needs to be transmitted by the terminal device is completed or the terminal device and the mobility management device set up a control plane bearer again, and the terminal device retransmits, through the user plane, the uplink data that is received by the mobility management device from the terminal device through the control plane but that is not sent to the service device when the mobility management device is overloaded.

For example, after receiving the user plane transmission instruction, the terminal device and the access network device set up a data radio bearer (DRB), and the access network device and the service device set up the user plane bearer. The terminal device sends the uplink data to the access network device through the data radio bearer, and then the access network device transmits the uplink data to the service device through the user plane bearer, until transmission of uplink data that needs to be transmitted by the terminal device is completed or the terminal device and the mobility management device set up a PDN connection again, and the terminal device retransmits, through the user plane, the uplink data that is received by the mobility management device from the terminal device through the control plane but that is not sent to the service device when the mobility management device is overloaded.

In an embodiment, when the back-off timer expires or after the terminal device transmits the uplink data, the terminal device initiates to set up the PDN connection. After the PDN connection is set up, the terminal device carries the uplink data by using the NAS message and sends the uplink data to the mobility management device.

In an embodiment, when the mobility management device is not overloaded, the terminal device continues to send the uplink data to the mobility management device by using the NAS message, and the mobility management device sends the received uplink data to the service device.

Figure 10:
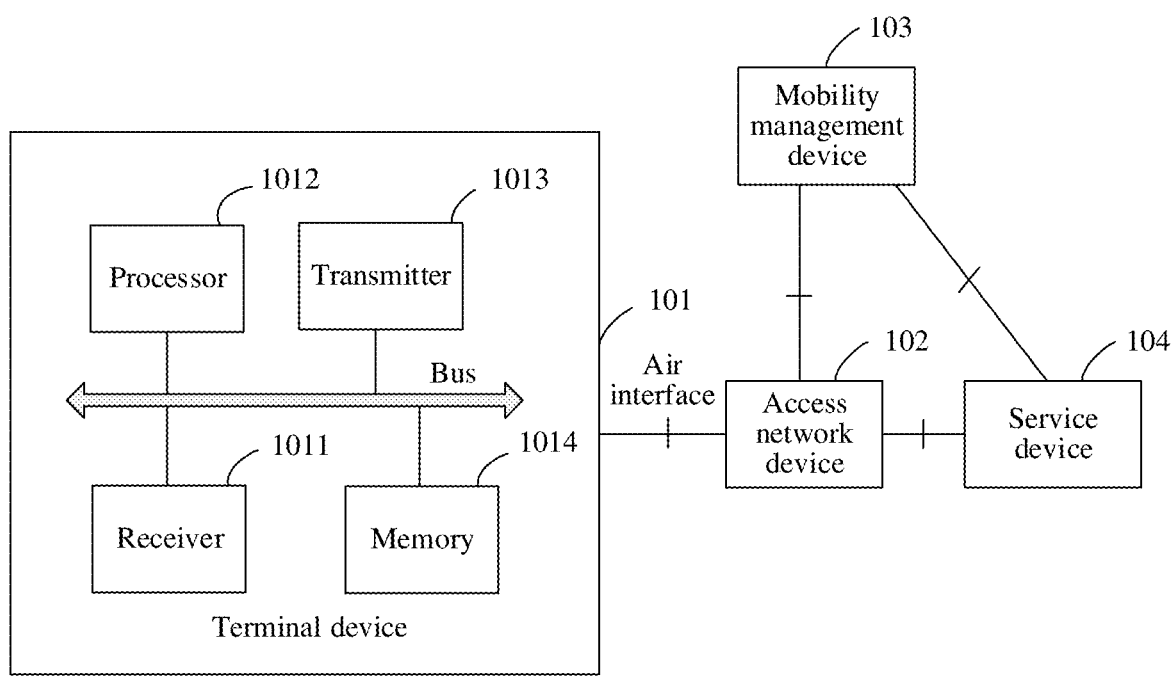
FIG. 10 is a schematic structural diagram of a communications system according to an embodiment.

FIG. 10 is a schematic structural diagram of a communications system according to an embodiment. The communications system may be a 2G, 3G, or 4G communications system or a new radio access network, for example, a GSM system, a CDMA system, a TDMA system, a WCDMA system, an FDMA system, an OFDMA system, an SC-FDMA system, a GPRS system, an LTE system, a UMTS network, a new radio access network, and other communications systems of this type. The new radio access network is also referred to as a 5G network, a next generation network, and the like.

The communications system may include a terminal device 101, an access network device 102, a mobility management device 103, and a service device 104. The access network device 102 may be a base station in the 2G, 3G, or 4G communications system or a gNB in a 5G communications system. Because standards of the communications systems are different (that is, access technologies are different), terms of devices and terms of interfaces between the devices are also different. For example, in an LTE communications system, the access network device 102 is an eNB, the mobility management device 103 is an MME, and the service device 104 is an S-GW. For another example, in the new radio access network, the access network device 102 is the gNB, and the mobility management device 103 is an AMF entity. The service device 104 includes an SMF entity and a UPF entity. A network architecture and an interface of the LTE communications system and the new radio access network are specifically shown in FIG. 5 and FIG. 6.

The terminal device 101 may be an IoT device such as a water meter and a power meter. The terminal device 101 includes: a receiver 1011, a processor 1012, a transmitter 1013, and a memory 1014, where the receiver 1011, the processor 1012, the transmitter 1013, and the memory 1014 communicate with each other through a bus.

In this embodiment of this application, the processor 1012 may be an EPLD, an FPGA, a DSP chip, an ASIC, another programmable logic device, a discrete gate, a transistor logic device, a discrete hardware component, or the like.

The memory 1014 is configured to store a code or instruction information, and may further store information about a device type. The memory 1014 may include a ROM and a RAM, to provide an instruction and data for the processor 1012. A part of the memory 1014 may further include a non-volatile random access memory.

The transmitter 1013 is configured to send a NAS message to the mobility management device 103, where the NAS message carries uplink data.

For example, the transmitter 1013 sends the NAS message to the mobility management device 103 through the access network device 102, where the NAS message carries the uplink data. For example, the NAS message is a control plane service request.

The receiver 1011 is configured to receive a notification that is sent when the mobility management device 103 is overloaded and that is of transmitting the uplink data through a user plane and a notification of retransmitting, through the user plane, uplink data that is received by the mobility management device 103 from the terminal device 101 but that is not sent to the service device 104 when the mobility management device 103 is overloaded.

The mobility management device 103 receives uplink data sent by the transmitter 1013 of the terminal device 101 by using the NAS message, and determines, based on a processing capability of the mobility management device 103, whether the mobility management device 103 is overloaded.

For example, after receiving the uplink data sent by the transmitter 1013 through a service request, the mobility management device 103 determines, based on all data (for example, uplink and/or downlink data) and all signaling (for example, uplink and/or downlink signaling) that are currently received, and the processing capability of the mobility management device 103, whether the processing capability of the mobility management device 103 reaches a threshold. For example, the mobility management device 103 determines whether a computing resource or a storage resource that has been used by the mobility management device 103 is greater than or equal to a first threshold (for example, equal to a largest value) or the mobility management device 103 determines whether a computing resource or storage resource available to the mobility management device 103 is less than or equal to a second threshold.

If the mobility management device 103 determines that the processing capability of the mobility management device 103 reaches the threshold, for example, the mobility management device 103 determines that the computing resource or the storage resource that has been used by the mobility management device 103 is greater than or equal to the first threshold (for example, equal to the largest value) or the mobility management device 103 determines that the computing resource or storage resource available to the mobility management device 103 is less than or equal to the second threshold, it is determined that the mobility management device 103 is overloaded. If the mobility management device 103 determines that the processing capability of the mobility management device 103 does not reach the threshold, for example, the mobility management device 103 determines that the computing resource or the storage resource that has been used by the mobility management device 103 is less than the first threshold (for example, does not reach the largest value) or the mobility management device 103 determines that the computing resource or storage resource available to the mobility management device 103 is greater than the second threshold, it is determined that the mobility management device 103 is not overloaded.

For example, when a user plane bearer between the mobility management device 103 and the service device 104 is not set up, the mobility management device 103 determines, based on all the data and control signaling (for example, the uplink data and/or uplink control signaling) that are currently received by the mobility management device 103, whether the processing capability of the mobility management device 103 reaches the threshold. When the user plane bearer between the mobility management device 103 and the service device 104 has been set up, the mobility management device 103 determines, based on all the data and the control signaling (for example, the uplink data, the uplink control signaling, downlink data and/or downlink control signaling) that are currently received by the mobility management device 103, whether the processing capability of the mobility management device 103 reaches the threshold.

For example, the receiver 1011 is further configured to receive the NAS message that is sent when the mobility management device 103 is overloaded, for example, the NAS message is an initial context setup request or a service accept message. The NAS message carries a user plane transmission instruction and a retransmission instruction. The user plane transmission instruction is used to instruct the terminal device 101 to transmit the uplink data through the user plane. The retransmission instruction is used to instruct the terminal device 101 to retransmit, through the user plane, uplink data that is received by the mobility management device 103 from the terminal device through the control plane but that is not sent to the service device 104 when the mobility management device 103 is overloaded. In an embodiment, the NAS message further carries a back-off timer. The back-off timer is used to indicate the terminal device 101 that the transmitter 1013 does not send the NAS message in a time segment specified by the back-off timer.

In an embodiment, the user plane transmission instruction, the retransmission instruction, and the back-off timer may be separately carried by different NAS messages or carried by two different NAS messages.

In an embodiment, when the mobility management device 103 is overloaded, the mobility management device 103 discards the uplink data that is received by the mobility management device 103 from the terminal device 101 but that is not sent to the service device 104 when the mobility management device 103 is overloaded.

In an embodiment, regardless of whether the user plane bearer is set up between the mobility management device 103 and the service device 104, the mobility management device 103 discards the uplink data that is received by the mobility management device 103 from the terminal device 101 but that is not sent to the service device 104 when the mobility management device 103 is overloaded.

The transmitter 1013 is further configured to transmit, through the user plane, uplink data after the mobility management device 103 is overloaded, until transmission of uplink data that needs to be transmitted by the terminal device 101 is completed or the terminal device 101 and the mobility management device 103 set up a control plane bearer again, and the transmitter 1013 is further configured to retransmit, through the user plane, the uplink data that is received by the mobility management device 103 from the terminal device through the control plane but that is not sent to the service device 104 when the mobility management device 103 is overloaded.

For example, after the receiver 1011 receives the user plane transmission instruction, the processor 1012 is configured to: set up a data radio bearer (DRB) with the access network device 102, and set up the user plane bearer with the service device 104. The transmitter 1013 is configured to send the uplink data to the access network device 102 through the data radio bearer, and then the access network device 102 sends the uplink data to the service device 104 through the user plane bearer, until transmission of the uplink data that needs to be transmitted by the terminal device 101 is completed or the terminal device 101 and the mobility management device 103 set up a PDN connection again. The transmitter 1013 is further configured to retransmit, through the user plane, the uplink data that is received by the mobility management device 103 from the terminal device 101 but that is not sent to the service device 104 when the mobility management device 103 is overloaded.

In an embodiment, if the user plane bearer has been set up between the mobility management device 103 and the service device 104, and the mobility management device 103 receives downlink data from the service device 104, when it is determined that the mobility management device 103 is overloaded, the receiver 1011 receives the downlink data sent by the mobility management device 103 through a NAS signaling. For example, the mobility management device 103 sends an initial context setup request to the access network device 102. The initial context setup request carries the downlink data. After sending an RRC connection setup request to the access network device 102, the transmitter 1013 receives a radio bearer setup complete message sent by the access network device. The radio bearer setup complete message carries the downlink data. In an embodiment, the initial context setup request and the radio bearer setup complete message further carry the back-off timer.

For example, in an embodiment, if the user plane bearer has been set up between the mobility management device 103 and the service device 104, and the mobility management device 103 receives the downlink data from the service device 104, when it is determined that the mobility management device 103 is overloaded, the mobility management device 103 sends the back-off timer and the downlink data to the access network device 102 by using the NAS message (for example, a downlink S1-AP message, for example, the downlink S1-AP message is a downlink NAS transport message), and then the transmitter 1013 receives the back-off timer and the downlink data sent by the access network device 102 by using the NAS message (for example, a downlink RRC direct transfer message).

In an embodiment, when the back-off timer expires or after the transmitter 1013 transmits uplink data that needs to be transmitted by the terminal device 101, the processor 1012 initiates to set up the PDN connection again. After the PDN connection is set up, the transmitter 1013 carries the uplink data by using the NAS message and sends the uplink data to the mobility management device 103.

In an embodiment, when the mobility management device 103 is not overloaded, the receiver 1011 is further configured to continue to send the uplink data to the mobility management device 103 by using the NAS message, and the mobility management device 103 sends the received uplink data to the service device 104.

Figure 11:
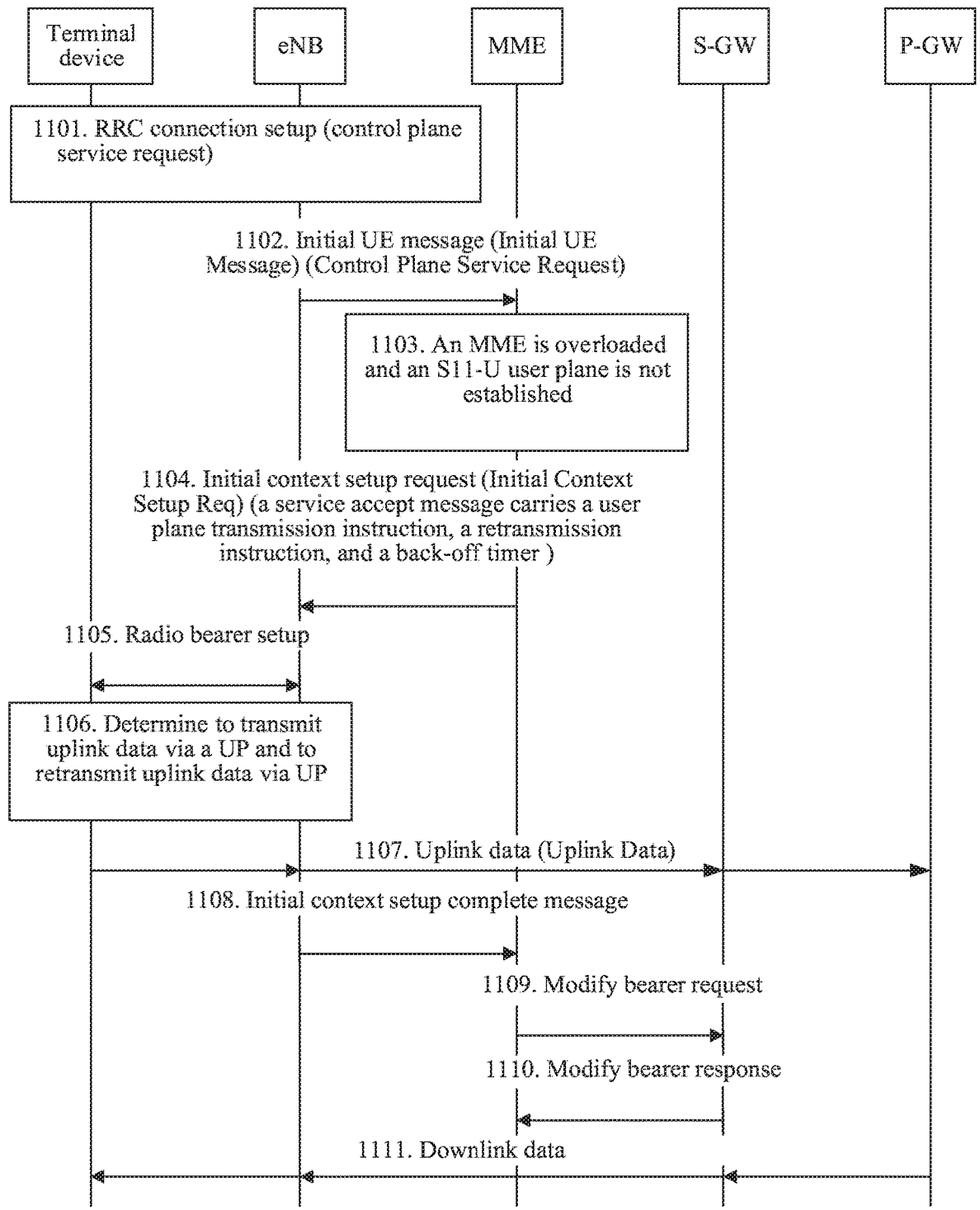
FIG. 11 is a schematic flowchart of a data processing method in an LTE communications system according to an embodiment.

FIG. 11 is a schematic flowchart of a data processing method in an LTE communications system according to an embodiment. Main processes of the data processing method are described as follows with reference to an LTE communications system architecture in FIG. 5.

Step 1101. A radio resource control (RRC) connection is set up between a terminal device in an idle state and an eNB, and the terminal device sends uplink data to the eNB by using the NAS message in the RRC connection setup process.

When there is no NAS signaling connection between the terminal device and an MME, that is, a dedicated S1 connection is not set up, the terminal device is in an idle (ECM Idle) state. The terminal device in the ECM idle state and the eNB set up an RRC connection (RRC connection establishment). The terminal device sends a control plane service request to the eNB in the RRC connection setup process. The control plane service request carries a NAS DATA PDU. The NAS DATA PDU carries the uplink data and an EBI. The control plane service request is a type of the NAS message, and is a control plane message.

Step 1102. The eNB sends an initial UE message to the MME through an S1-MME interface.

For example, the initial UE message carries the control plane service request, where the control plane service request is a type of the NAS message and carries the NAS DATA PDU. The NAS DATA PDU carries the uplink data and the EBI.

Step 1103. The MME determines whether the MME is overloaded and determines whether an S11 user plane (S11-U) bearer between the MME and an S-GW has been set up.

After receiving the uplink data sent by the terminal device through the service request, the MME determines, based on all data (for example, uplink and/or downlink data) and all signaling (for example, uplink and/or downlink signaling) that are currently received, and a processing capability of the MME, whether the processing capability of the MME reaches a threshold. For example, the MME determines whether a computing resource or a storage resource that has been used by the MME is greater than or equal to a first threshold (for example, equal to a largest value) or the MME determines whether a computing resource or storage resource available to the MME is less than or equal to a second threshold.

If the MME determines that the processing capability of the MME reaches the threshold, for example, the MME determines that the computing resource or the storage resource that has been used by the MME is greater than or equal to the first threshold (for example, equal to the largest value) or the MME determines that the computing resource or storage resource available to the MME is less than or equal to the second threshold, it is determined that the MME is overloaded. If the MME determines that the processing capability of the MME does not reach the threshold, for example, the MME determines that the computing resource or the storage resource that has been used by the MME is less than the first threshold (for example, does not reach the largest value) or the MME determines that the computing resource or storage resource available to the MME is greater than the second threshold, it is determined that the MME is not overloaded.

The MME further determines whether the S11-U bearer between the MME and the S-GW is set up.

Step 1104. If the MME is overloaded and the S11-U is not set up, the MME sends an initial context setup request to the eNB.

The initial context setup request carries a service accept message. The service accept message carries a user plane transmission instruction and a retransmission instruction. The user plane transmission instruction is used to instruct the terminal device to transmit the uplink data through the user plane. To be specific, the user plane transmission instruction is used to instruct the terminal device to transmit, through the user plane, uplink data after the uplink data that is received by the MME from the terminal device through a control plane when the MME is overloaded. The retransmission instruction is used to instruct the terminal device to retransmit, through the user plane, the uplink data that is received by the mobility management device from the terminal device through the control plane but that is not sent to a service device when the mobility management device is overloaded. In an embodiment, the service accept message further carries a back-off timer. The back-off timer is used to instruct the terminal device not to send the NAS message in a time segment specified by the back-off timer.

In an embodiment, a header field or an idle field of the service accept message carries the user plane transmission instruction, the retransmission instruction, and the back-off timer.

In an embodiment, the user plane transmission instruction, the retransmission instruction, and the back-off timer may be separately carried by different NAS messages or carried by a header field or an idle field of two different NAS messages.

Step 1105. The terminal device and the eNB set up a data radio bearer (Radio Bearers Setup).

In a data radio bearer setup process, the eNB sends the user plane transmission instruction, the retransmission instruction, and the back-off timer to the terminal device. For example, the terminal device sends a radio bearer setup request to the eNB, and a header field or an idle field of a radio bearer setup complete message sent by the eNB to the terminal device carries the user plane transmission instruction, the retransmission instruction, and the back-off timer.

Step 1106. The terminal device determines, based on the user plane transmission instruction, to transmit the uplink data through a user plane, and determines, based on the retransmission instruction, to retransmit, through the user plane, the uplink data that is received by the MME from the terminal device through a control plane but that is not sent to the S-GW when the MME is overloaded.

The terminal device further skips sending the NAS message based on the back-off timer in a time segment specified by the back-off timer.

Step 1107. The terminal device transmits the uplink data through the user plane.

For example, after receiving the retransmission instruction, the terminal device sends the uplink data that is received by the MME from the terminal device through the control plane but that is not sent to the S-GW when the MME is overloaded, to the eNB through the data radio bearer, until the terminal device completes transmitting the uplink data.

In an embodiment, when the MME is overloaded, the MME discards the uplink data that is received by the MME from the terminal device through the control plane but that is not sent to the S-GW when the MME is overloaded. For example, the uplink data that is received from the terminal device through the control plane but that is not sent to the S-GW when the MME is overloaded is cleared in a buffer of the MME.

Step 1108. The eNB sends an initial context setup complete message (Init context setup complete message) to the MME.

Step 1109. The MME sends a modify bearer request to the S-GW.

The MME sends the modify bearer request to the S-GW, and the modify bearer request carries an address of the eNB and a tunnel identifier of the eNB. The modify bearer request is used to request to set up an S1 user plane (S1-U) bearer between the eNB and the S-GW.

Step 1110. The S-GW sends a modify bearer response to the MME.

After the MME receives the modify bearer response, the S1-U bearer between the eNB and the S-GW is set up.

The terminal device sends uplink data after the MME is overloaded, to be specific, uplink data after the uplink data that is received by the MME from the terminal device through the control plane when the MME is overloaded, to the S-GW based on the received user plane transmission instruction through the user plane, until transmission of uplink data that needs to be transmitted by the terminal device is completed or the terminal device and the MME set up a PDN connection again. For example, the terminal device sends the uplink data after the MME is overloaded, to the eNB through the data radio bearer, the eNB sends the received uplink data to the S-GW through the S1-U bearer between the eNB and the S-GW, and then the S-GW sends the uplink data to a P-GW.

Step 1111. The P-GW sends downlink data (Downlink data) to the terminal device through the S-GW and the eNB successively.

For example, the P-GW sends the downlink data to the terminal device in the user plane through the S-GW and the eNB successively. For example, the P-GW sends the downlink data to the S-GW, the S-GW sends the downlink data to the eNB through the S1-U bearer, and then the eNB sends the downlink data to the terminal device.

Figure 12:
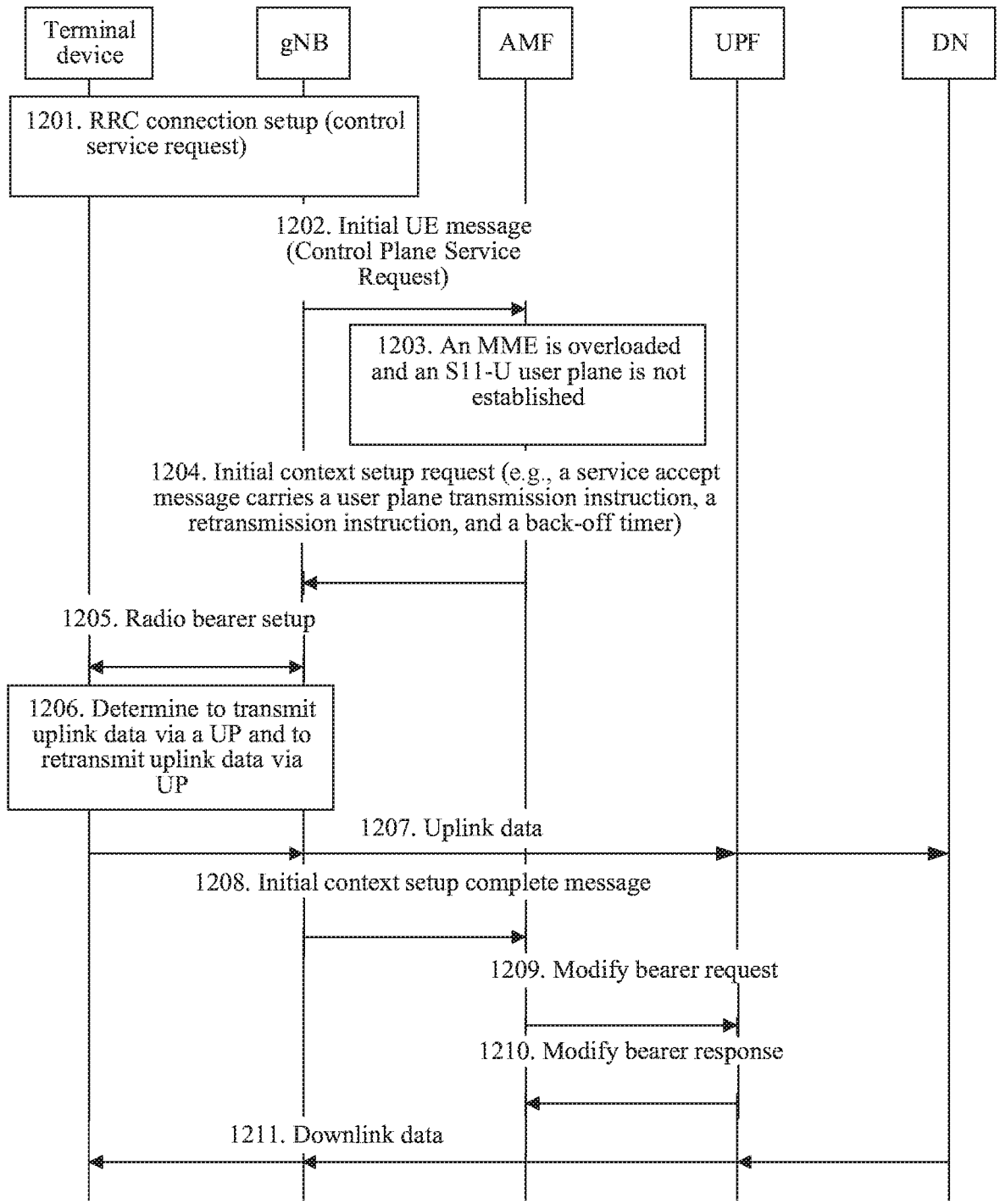
FIG. 12 is a schematic flowchart of a data processing method in a new radio access network according to an embodiment.

The foregoing embodiments describe a data processing method in the LTE communications system. In a new radio access network (for example, a 5G communications system), a similar data processing method is also used. For example, FIG. 12 is a schematic flowchart of a data processing method in a new radio access network according to an embodiment. Main processes of the data processing method are described as follows with reference to a network architecture in FIG. 6.

Step 1201. A radio resource control (RRC) connection is set up between a terminal device in an idle state and a gNB, and the terminal device sends uplink data to the gNB by using a NAS message in an RRC connection setup process.

The terminal device in the idle state sends a control plane service request to the gNB in the RRC connection setup process. The control plane service request carries a NAS DATA PDU, where the NAS DATA PDU carries the uplink data and an EBI, and the control plane service request is a type of the NAS message and is a control plane message.

Step 1202. The gNB sends an initial UE message to an AMF through an N2 interface.

For example, the initial UE message carries the control plane service request. The control plane service request is a type of the NAS message and carries the NAS DATA PDU, where the NAS DATA PDU carries the uplink data and the EBI.

Step 1203. The AMF determines whether the AMF is overloaded and determines whether an N11 user plane (N11-U) bearer between the AMF and an SMF has been set up.

After receiving the uplink data sent by the terminal device through the service request, the AMF determines, based on all data (for example, uplink and/or downlink data) and all signaling (for example, uplink and/or downlink signaling) that are currently received, and a processing capability of the AMF, whether the processing capability of the AMF reaches a threshold. For example, the AMF determines whether a computing resource or a storage resource that has been used by the AMF is greater than or equal to a first threshold (for example, equal to a largest value) or the AMF determines whether a computing resource or storage resource available to the AMF is less than or equal to a second threshold.

If the AMF determines that the processing capability of the AMF reaches the threshold, for example, the AMF determines that the computing resource or the storage resource that has been used by the AMF is greater than or equal to the first threshold (for example, equal to the largest value) or the AMF determines that the computing resource or storage resource available to the AMF is less than or equal to the second threshold, it is determined that the AMF is overloaded. If the AMF determines that the processing capability of the AMF does not reach the threshold, for example, the AMF determines that the computing resource or the storage resource that has been used by the AMF is less than the first threshold (for example, does not reach the largest value) or the AMF determines that the computing resource or storage resource available to the AMF is greater than the second threshold, it is determined that the AMF is not overloaded.

The AMF further determines whether the N11-U bearer between the AMF and the SMF is set up.

Step 1204. If the AMF is overloaded and the N11-U is not set up, the AMF sends an initial context setup request to the gNB.

The initial context setup request carries a service accept message. The service accept message carries a user plane transmission instruction and a retransmission instruction. The user plane transmission instruction is used to instruct the terminal device to transmit the uplink data through the user plane. The retransmission instruction is used to instruct the terminal device to retransmit, through the user plane, uplink data that is received by the mobility management device from the terminal device through a control plane but that is not sent to a service device when the mobility management device is overloaded. In an embodiment, the service accept message further carries a back-off timer (back-off timer). The back-off timer is used to instruct the terminal device not to send the NAS message in a time segment specified by the back-off timer.

In an embodiment, a header field or an idle field of the service accept message carries the user plane transmission instruction, the retransmission instruction, and the back-off timer.

In an embodiment, the user plane transmission instruction, the retransmission instruction, and the back-off timer may be separately carried by different NAS messages or carried by a header field or an idle field of two different NAS messages.

Step 1205. The terminal device and the gNB set up a data radio bearer.

In a data radio bearer setup process, the gNB sends the user plane transmission instruction, the retransmission instruction, and the back-off timer to the terminal device. For example, the terminal device sends a radio bearer setup request to the gNB, and a header field or an idle field of a radio bearer setup complete message sent by the gNB to the terminal device carries the user plane transmission instruction, the retransmission instruction, and the back-off timer.

Step 1206. The terminal device determines, based on the user plane transmission instruction, to transmit the uplink data through the user plane, and determines, based on the retransmission instruction, to retransmit, through the user plane, the uplink data that is received by the AMF from the terminal device through a control plane but that is not sent to the SMF when the AMF is overloaded.

The terminal device further skips sending the NAS message based on the back-off timer in a time segment specified by the back-off timer.

Step 1207. The terminal device transmits the uplink data through the user plane.

For example, after receiving the retransmission instruction, the terminal device sends the uplink data that is received by the AMF from the terminal device through the control plane but that is not sent to the SMF when the AMF is overloaded, to the gNB through the data radio bearer, until the terminal device completes transmitting the uplink data. The gNB sends the received uplink data to a UPF through an N3 user plane (N3-U) bearer between the gNB and the UPF, and then the UPF sends the uplink data to a DN.

In an embodiment, when the AMF is overloaded, the AMF discards the uplink data that is received by the AMF from the terminal device through the control plane but that is not sent to the SMF when the AMF is overloaded. For example, the uplink data that is received from the terminal device through the control plane but that is not sent to the SMF when the AMF is overloaded is cleared in a buffer of the AMF.

Step 1208. The gNB sends an initial context setup complete message (Init context setup complete message) to the AMF.

Step 1209. The AMF sends a modify bearer request to the UPF.

The AMF sends the modify bearer request to the UPF, and the modify bearer request carries an address of the gNB and a tunnel identifier of the gNB. The modify bearer request is used to request to set up an N3 user plane (N3-U) bearer between the gNB and the UPF.

Step 1210. The UPF sends a modify bearer response to the AMF.

After the AMF receives the modify bearer response, the N3-U bearer between the gNB and the UPF is set up.

The terminal device sends uplink data after the AMF is overloaded, to be specific, uplink data after the uplink data that is received by the AMF from the terminal device through the control plane when the AMF is overloaded, to the UPF based on the received user plane transmission instruction through the user plane, until transmission of uplink data that needs to be transmitted by the terminal device is completed or the terminal device and the AMF set up a PDN connection again. For example, the terminal device sends the uplink data after the AMF is overloaded, to the gNB through the data radio bearer, the gNB sends the received uplink data to the UPF through the N3-U bearer between the gNB and the UPF, and then the UPF sends the uplink data to a DN.

Step 1211. The DN sends downlink data (Downlink data) to the terminal device through the UPF and the gNB successively.

For example, the DN sends the downlink data to the terminal device in the user plane through the UPF and the gNB successively.

Figure 13:
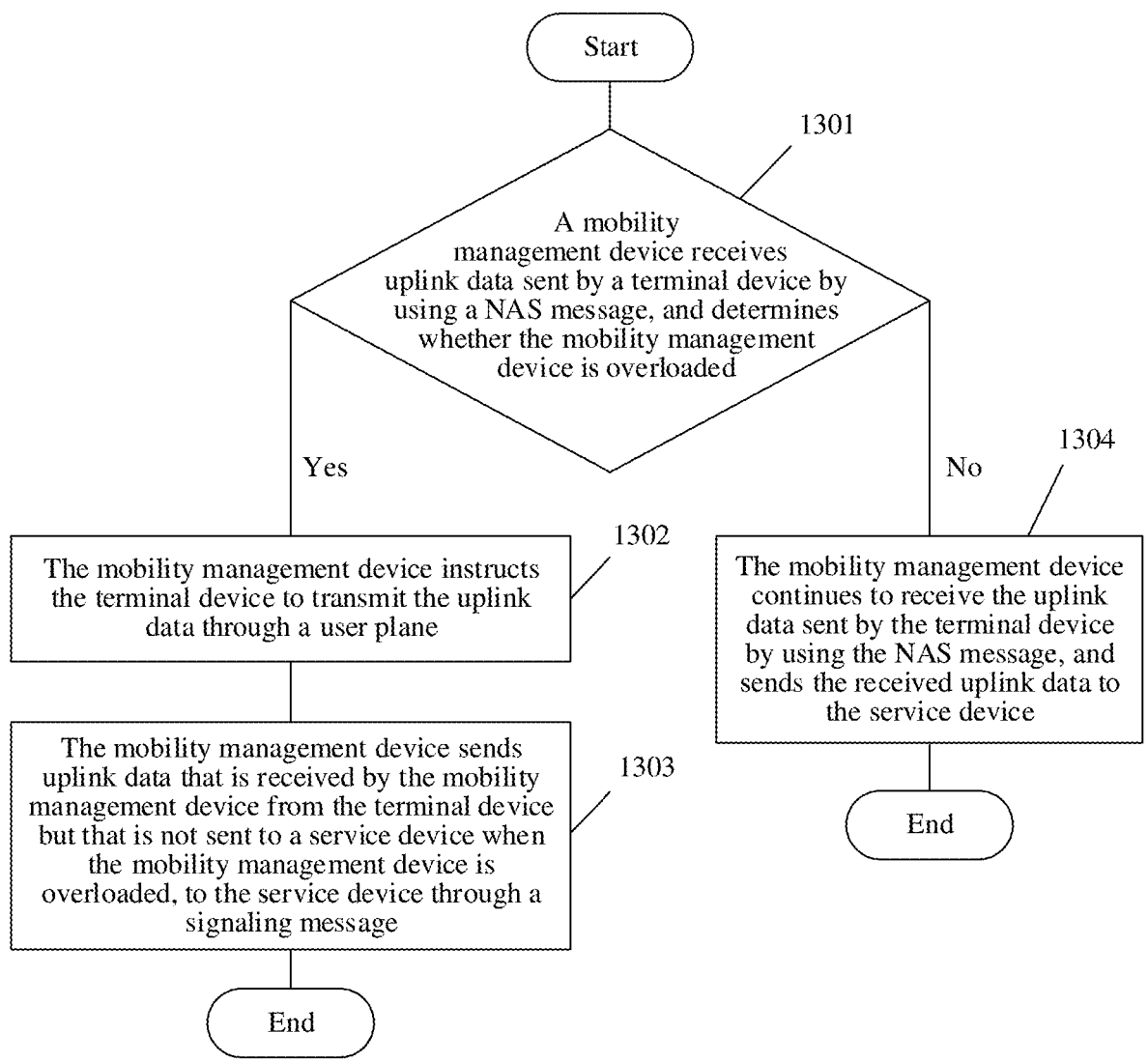
FIG. 13 is a schematic flowchart of a data processing method according to an embodiment.

FIG. 13 is a schematic flowchart of a data processing method according to an embodiment. The data processing method may be applicable to various communications systems, for example, an LTE communications system or a new radio access network. For brevity of description, the data processing method in this embodiment is described by using a network architecture in FIG. 4 as an example, and main processes are described as follows.

Step 1301. A mobility management device receives uplink data sent by a terminal device by using a NAS message, and determines, based on a processing capability of the mobility management device, whether the mobility management device is overloaded.

For example, the terminal device sends the NAS message to the mobility management device through an access network device, where the NAS message carries the uplink data, for example, the NAS message is a control plane service request. After receiving the uplink data sent by the terminal device through the service request, the mobility management device determines, based on all data (for example, uplink and/or downlink data) and all signaling (for example, uplink and/or downlink signaling) that are currently received, and a processing capability of the mobility management device, whether the processing capability of the mobility management device reaches a threshold. For example, the mobility management device determines whether a computing resource or a storage resource that has been used by the mobility management device is greater than or equal to a first threshold (for example, equal to a largest value) or the mobility management device determines whether a computing resource or storage resource available to the mobility management device is less than or equal to a second threshold.

If the mobility management device determines that the processing capability of the mobility management device reaches the threshold, for example, the mobility management device determines that the computing resource or the storage resource that has been used by the mobility management device is greater than or equal to the first threshold (for example, equal to the largest value) or the mobility management device determines that the computing resource or storage resource available to the mobility management device is less than or equal to the second threshold, it is determined that the mobility management device is overloaded. If the mobility management device determines that the processing capability of the mobility management device does not reach the threshold, for example, the mobility management device determines that the computing resource or the storage resource that has been used by the mobility management device is less than the first threshold (for example, does not reach the largest value) or the mobility management device determines that the computing resource or storage resource available to the mobility management device is greater than the second threshold, it is determined that the mobility management device is not overloaded.

Step 1302. When the mobility management device is overloaded, the mobility management device instructs the terminal device to transmit the uplink data through the user plane.

For example, the mobility management device sends the NAS message to the terminal device, for example, a context setup request or a service accept message. The NAS message carries a user plane transmission instruction. The user plane transmission instruction is used to instruct the terminal device to transmit the uplink data through the user plane. To be specific, the user plane transmission instruction is used to instruct the terminal device to transmit, through the user plane, uplink data after the uplink data that is received by the mobility management device from the terminal device through the control plane when the mobility management device is overloaded. In an embodiment, the NAS message further carries a back-off timer. The back-off timer is used to instruct the terminal device not to send the NAS message in a time segment specified by the back-off timer.

In an embodiment, the user plane transmission instruction and the back-off timer may be respectively carried by two different NAS messages.

For example, after a user plane bearer is set up between the access network device and the service device, the terminal device sends the uplink data to the access network device through the data radio bearer, and the access network device sends the uplink data to the service device through the user plane bearer between the access network device and the service device.

Step 1303. The mobility management device sends the uplink data that is received from the terminal device through a control plane but that is not sent to a service device when the mobility management device is overloaded, to the service device through a signaling message.

For example, when a user plane bearer between the mobility management device and the service device is not set up, the mobility management device sends the signaling message, for example, a GPRS tunneling protocol (GTP) message or a modify bearer request message, to the service device. The signaling message carries the uplink data that is received by the mobility management device from the terminal device through the control plane but that is not sent to the service device when the mobility management device is overloaded. For example, the modify bearer request message is used to request to set up the user plane bearer between the access network device and the service device. The modify bearer request message carries the uplink data that is received by the mobility management device from the terminal device through the control plane but that is not sent to the service device when the mobility management device is overloaded. For example, the modify bearer request message carries, through a header field or an idle field of the modify bearer request message, the uplink data that is received from the terminal device through the control plane but that is not sent to the service device when the mobility management device is overloaded.

Step 1304. When the mobility management device is not overloaded, the mobility management device continues to receive the uplink data sent by the terminal device by using the NAS message, and sends the received uplink data to the service device.

In an embodiment, when the back-off timer expires or after the terminal device transmits the uplink data, the terminal device initiates to set up a PDN connection again. After the PDN connection is set up, the terminal device carries the uplink data by using the NAS message and sends the uplink data to the mobility management device.

Therefore, in the data processing method described above, when the mobility management device is overloaded, the mobility management device sends the uplink data that is received from the terminal device through the control plane but that is not sent to the service device when the mobility management device is overloaded, to the service device through the modify bearer request message. Therefore, when a bearer between the mobility management device and the service device is not set up, the bearer does not need to be first set up and then released, saving signaling and resources.

Figure 14:
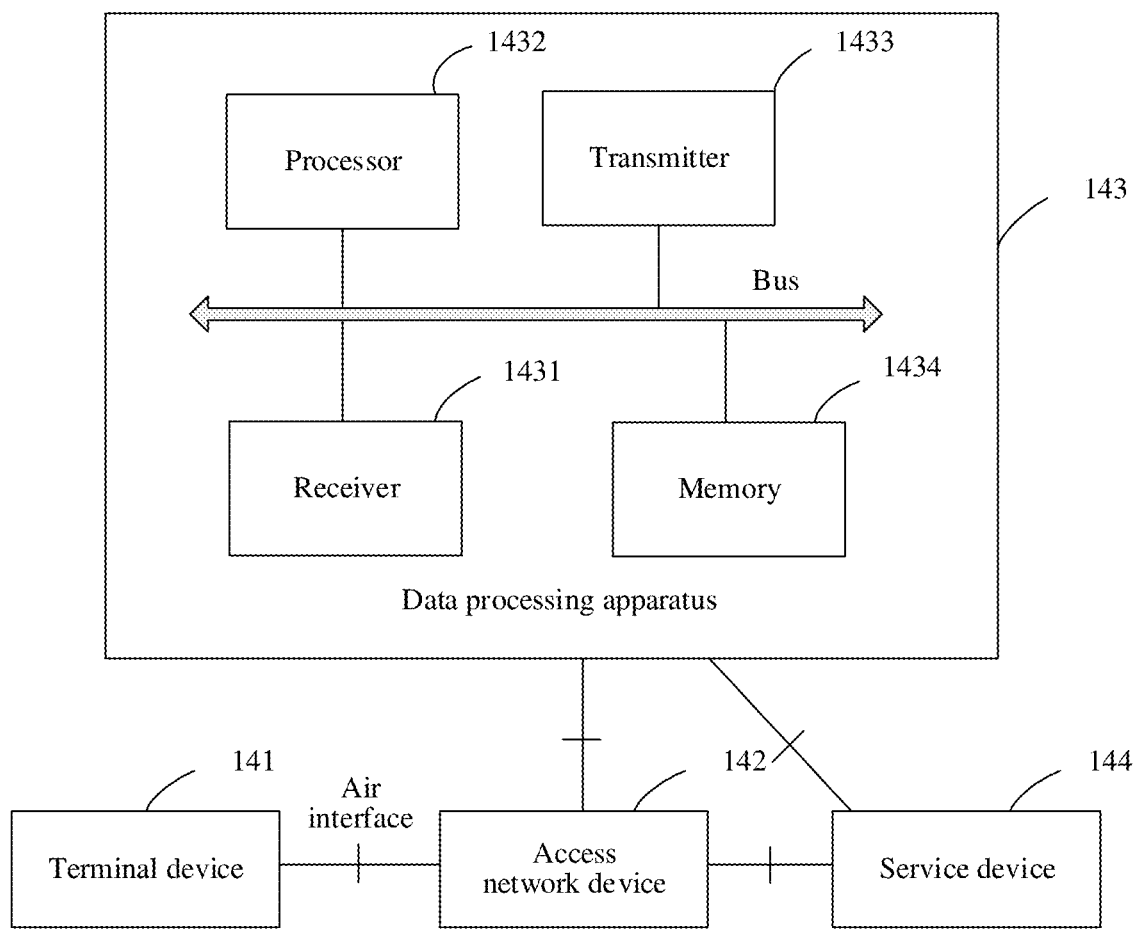
FIG. 14 is a schematic structural diagram of a communications system according to an embodiment.

FIG. 14 is a schematic structural diagram of a communications system according to an embodiment. The communications system may be a 2G, 3G, or 4G communications system or a new radio access network, for example, a GSM system, a CDMA system, a TDMA system, a WCDMA system, an FDMA system, an OFDMA system, an SC-FDMA system, a GPRS system, an LTE system, a UMTS network, a new radio access network, and other communications systems of this type. The new radio access network is also referred to as a 5G network, a next generation network, and the like.

The communications system may include a terminal device 141, an access network device 142, a data processing apparatus 143, and a service device 144. The access network device 142 may be a base station in the 2G, 3G, or 4G communications system or a gNB in a 5G communications system. Because standards of the communications systems are different (that is, access technologies are different), terms of devices and terms of interfaces between the devices are also different. For example, the data processing apparatus 143 may be a mobility management device. For example, in an LTE communications system, the access network device 142 is an eNB, the data processing apparatus 143 is an MME, and the service device 144 is an S-GW. For another example, in the new radio access network, the access network device 142 is the gNB, and the data processing apparatus 143 is an AMF entity. The service device 144 includes an SMF entity and a UPF entity. A network architecture and an interface of the LTE communications system and the new radio access network are specifically shown in FIG. 5 and FIG. 6.

The terminal device 141 may be an IoT device such as a water meter and a power meter.

The data processing apparatus 143 includes: a receiver 1431, a processor 1432, a transmitter 1433, and a memory 1434, where the receiver 1431, the processor 1432, the transmitter 1433, and the memory 1434 communicate with each other through a bus.

In this embodiment of this application, the processor 1432 may be an EPLD, an FPGA, a DSP chip, an ASIC, another programmable logic device, a discrete gate, a transistor logic device, a discrete hardware component, or the like.

The memory 1434 is configured to store a code or instruction information, and may further store information about a device type. The memory 1434 may include a ROM and a RAM, to provide an instruction and data for the processor 1432. A part of the memory 1434 may further include a non-volatile random access memory.

The receiver 1431 is configured to: receive the uplink data sent by the terminal device 141 by using a NAS message, and determine, based on a processing capability of the processor 1432, whether the data processing apparatus 143 is overloaded.

For example, the receiver 1431 receives the NAS message sent by the terminal device 141 through the access network device 142, where the NAS message carries the uplink data. For example, the NAS message is a control plane service request. After the receiver 1431 receives the uplink data sent by the terminal device 141 through the service request, the processor 1432 is configured to determine, based on all data (for example, uplink and/or downlink data) and all signaling (for example, uplink and/or downlink signaling) that are currently received by the receiver 1431, and a processing capability of the processor 1432, whether the processing capability of the processor 1432 reaches a threshold. For example, the processor 1432 determines whether a computing resource or a storage resource that has been used by the processor 1432 is greater than or equal to a first threshold (for example, equal to a largest value) or the processor 1432 determines whether a computing resource or storage resource available to the processor 1432 is less than or equal to a second threshold.

If the processor 1432 determines that the processing capability of the processor 1432 reaches the threshold, for example, the processor 1432 determines that the computing resource or the storage resource that has been used by the processor 1432 is greater than or equal to the first threshold (for example, equal to the largest value) or the processor 1432 determines that the computing resource or storage resource available to the processor 1432 is less than or equal to the second threshold, it is determined that the processor 1432 is overloaded. If the processor 1432 determines that the processing capability of the processor 1432 does not reach the threshold, for example, the processor 1432 determines that the computing resource or the storage resource that has been used by the processor 1432 is less than the first threshold (for example, does not reach the largest value) or the processor 1432 determines that the computing resource or storage resource available to the processor 1432 is greater than the second threshold, it is determined that the processor 1432 is not overloaded.

When it is determined that the processor 1432 is overloaded, the transmitter 1433 is configured to instruct the terminal device 141 to transmit the uplink data through the user plane.

For example, the transmitter 1433 sends the NAS message, for example, a context setup request or a service accept message, to the terminal device 141. The NAS message carries a user plane transmission instruction. The user plane transmission instruction is used to instruct the terminal device 141 to transmit the uplink data through the user plane. To be specific, the user plane transmission instruction is used to instruct the terminal device 141 to transmit, through the user plane, uplink data after the uplink data that is received by the receiver 1431 from the terminal device 141 through the control plane when it is determined that the processor 1432 is overloaded. In an embodiment, the NAS message further carries a back-off timer. The back-off timer is used to instruct the terminal device 141 not to send the NAS message in a time segment specified by the back-off timer.

For example, after a user plane bearer between the access network device 142 and the service device 144 is set up, the terminal device 141 sends the uplink data to the access network device 142 through the data radio bearer, and the access network device 142 sends the uplink data to the service device 144 through the user plane bearer between the access network device 142 and the service device 144.

In an embodiment, the user plane transmission instruction and the back-off timer may be respectively carried by two different NAS messages.

The transmitter 1433 is further configured to send a signaling message to the service device 144. The signaling message carries the uplink data that is received from the terminal device 141 through a control plane but that is not sent to the service device 144 when the data processing apparatus 143 is overloaded.

For example, when the user plane bearer between the data processing apparatus 143 and the service device 144 is not set up, the transmitter 1433 is further configured to send the signaling message, for example, a GPRS tunneling protocol (GTP) message or a modify bearer request message, to the service device 144. The signaling message carries the uplink data that is received by the mobility management device from the terminal device through the control plane but that is not sent to the service device when the mobility management device is overloaded. For example, the modify bearer request message is used to request to set up a user plane bearer between the access network device 142 and the service device 144. The modify bearer request message carries the uplink data that is received by the data processing apparatus 143 from the terminal device 141 through the control plane but that is not sent to the service device 144 when the data processing apparatus 143 is overloaded. For example, the modify bearer request message carries, through a header field or an idle field of the modify bearer request message, the uplink data that is received from the terminal device 141 through the control plane but that is not sent to the service device 144 when the data processing apparatus 143 is overloaded.

When it is determined that the processor 1432 is not overloaded, the receiver 1431 is further configured to continue to receive the uplink data sent by the terminal device 141 by using the NAS message, and the transmitter 1433 is further configured to send the received uplink data to the service device 144.

In an embodiment, when the back-off timer expires or after the terminal device 141 transmits the uplink data, the terminal device 141 initiates to set up a PDN connection again. After the PDN connection is set up, the terminal device 141 carries the uplink data by using the NAS message and sends the uplink data to the data processing apparatus 143.

Therefore, in the data processing method described above, when the mobility management device is overloaded, the mobility management device sends the uplink data that is received from the terminal device 141 through the control plane but that is not sent to the service device 144 when the mobility management device is overloaded, to the service device 144 through the modify bearer request message. Therefore, when a bearer between the mobility management device and the service device 144 is not set up, the bearer does not need to be first set up and then released, saving signaling and resources.

Figure 15:
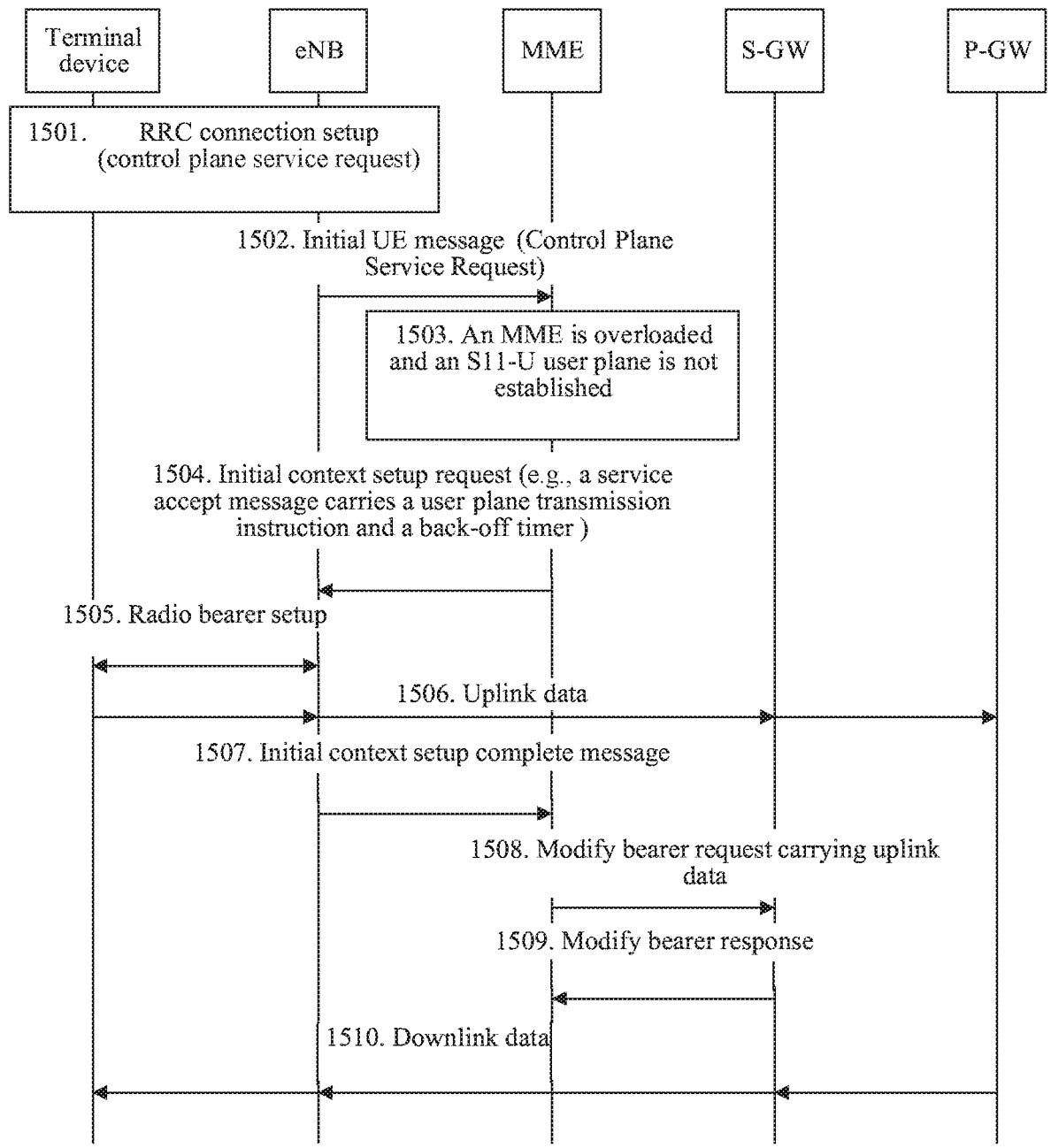
FIG. 15 is a schematic flowchart of a data processing method in an LTE communications system according to an embodiment.

FIG. 15 is a schematic flowchart of a data processing method in an LTE communications system according to an embodiment. Main processes of the data processing method are described as follows with reference to a structural diagram of the LTE communications system in FIG. 5.

Step 1501. A radio resource control (RRC) connection is set up between a terminal device in an idle state and an eNB, and the terminal device sends uplink data to the eNB by using a NAS message in an RRC connection setup process.

The terminal device in the idle state sends a control plane service request to the eNB in the RRC connection setup process. The control plane service request carries a NAS DATA PDU, where the NAS DATA PDU carries the uplink data and an EBI, and the control plane service request is a type of the NAS message and is a control plane message.

Step 1502. The eNB sends an initial UE message to an MME through an S1-MME interface.

For example, the initial UE message carries the control plane service request. The control plane service request is a type of the NAS message and carries the NAS DATA PDU, where the NAS DATA PDU carries the uplink data and the EBI.

Step 1503. The MME determines whether the MME is overloaded and determines whether an S11 user plane (S11-U) bearer between the MME and the S-GW has been set up.

After receiving the uplink data sent by the terminal device through the service request, the MME determines, based on all data (for example, uplink and/or downlink data) and all signaling (for example, uplink and/or downlink signaling) that are currently received, and a processing capability of the MME, whether the processing capability of the MME reaches a threshold. For example, the MME determines whether a computing resource or a storage resource that has been used by the MME is greater than or equal to a first threshold (for example, equal to a largest value) or the MME determines whether a computing resource or storage resource available to the MME is less than or equal to a second threshold.

If the MME determines that the processing capability of the MME reaches the threshold, for example, the MME determines that the computing resource or the storage resource that has been used by the MME is greater than or equal to the first threshold (for example, equal to the largest value) or the MME determines that the computing resource or storage resource available to the MME is less than or equal to the second threshold, it is determined that the MME is overloaded. If the MME determines that the processing capability of the MME does not reach the threshold, for example, the MME determines that the computing resource or the storage resource that has been used by the MME is less than the first threshold (for example, does not reach the largest value) or the MME determines that the computing resource or storage resource available to the MME is greater than the second threshold, it is determined that the MME is not overloaded.

Step 1504. If the MME is overloaded and the S11-U is not set up, the MME sends an initial context setup request (Initial context setup request) to the eNB.

The initial context setup request carries a service accept message. The service accept message carries a user plane transmission instruction. The user plane transmission instruction is used to instruct the terminal device to transmit the uplink data through the user plane. To be specific, the user plane transmission instruction is used to instruct the terminal device to transmit, through the user plane, uplink data after the uplink data that is received by the MME from the terminal device through a control plane when the MME is overloaded. In an embodiment, the service accept message further carries a back-off timer. The back-off timer is used to instruct the terminal device not to send the NAS message in a time segment specified by the back-off timer.

In an embodiment, a header field or an idle field of the service accept message carries the user plane transmission instruction and the back-off timer.

In an embodiment, the user plane transmission instruction and the back-off timer may be separately carried by different NAS messages.

Step 1505. The terminal device and the eNB set up a data radio bearer.

In a data radio bearer setup process, the eNB sends the user plane transmission instruction and the back-off timer to the terminal device. For example, the terminal device sends a radio bearer setup request to the eNB, and a header field or an idle field of a radio bearer setup complete message sent by the eNB to the terminal device carries the user plane transmission instruction and the back-off timer.

Step 1506. The terminal device transmits the uplink data through the user plane.

For example, after receiving the user plane transmission instruction, the terminal device determines, based on the user plane transmission instruction, to transmit the uplink data through the user plane. For example, the terminal device sends uplink data after the uplink data that is received by the MME from the terminal device through the control plane when the MME is overloaded, to the eNB through the data radio bearer, until transmission of uplink data that needs to be transmitted by the terminal device is completed or the terminal device and the MME set up a PDN connection again.

Step 1507. The eNB sends an initial context setup complete message (Init context setup complete message) to the MME.

Step 1508. The MME sends a modify bearer request to the S-GW.

The MME sends the modify bearer request to the S-GW. The modify bearer request is used to request to set up an S1-U bearer between the eNB and the S-GW. The modify bearer request carries the uplink data that is received from the terminal device through the control plane but that is not sent to the S-GW, an address of the eNB, and a tunnel identifier of the eNB when the MME is overloaded. For example, the modify bearer request carries, through a header field or an idle field of the modify bearer request, the uplink data that is received from the terminal device through the control plane but that is not sent to the S-GW when the MME is overloaded.

Step 1509. The S-GW sends a modify bearer response to the MME.

After the MME receives the modify bearer response, the S1-U bearer between the eNB and the S-GW is set up.

The eNB sends the received uplink data to the S-GW through an S1 user plane (S1-U) bearer between the eNB and the S-GW, and then the S-GW sends the uplink data to a P-GW.

Step 1510. The P-GW sends downlink data to the terminal device in the user plane through the S-GW and the eNB successively.

For example, the P-GW sends the downlink data to the S-GW, the S-GW sends the downlink data to the eNB through the S1-U bearer, and then the eNB sends the downlink data to the terminal device.

Figure 16:
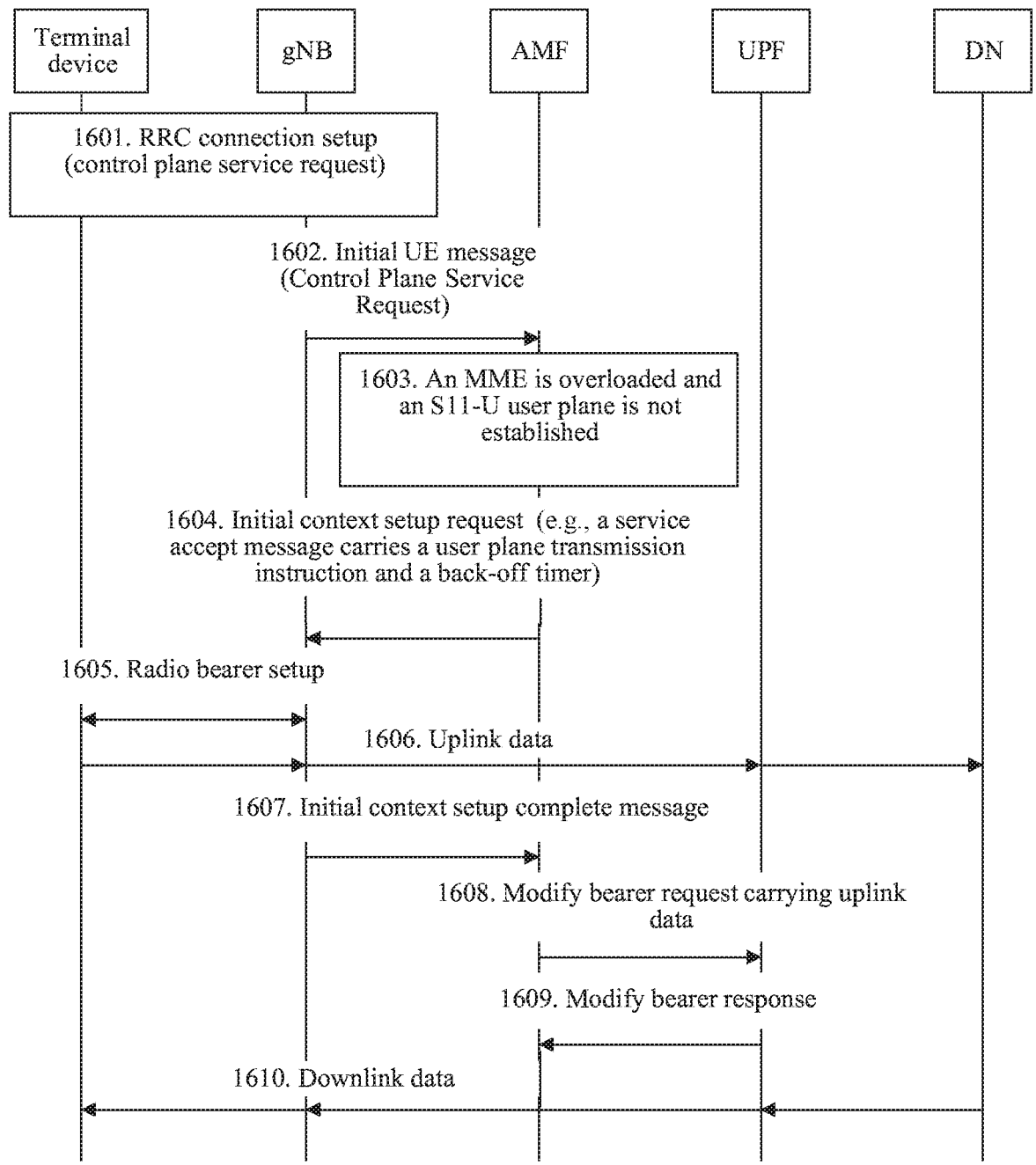
FIG. 16 is a schematic flowchart of a data processing method in a new radio access network according to an embodiment.

FIG. 16 is a schematic flowchart of a data processing method in a new radio access network according to an embodiment. Main processes of the data processing method are described as follows with reference to a structural diagram of the new radio access network in FIG. 6.

Step 1601. A radio resource control (RRC) connection is set up between a terminal device in an idle state and a gNB, and the terminal device sends uplink data to the gNB by using a NAS message in an RRC connection setup process.

The terminal device in the idle state sends a control plane service request to the gNB in the RRC connection setup process. The control plane service request carries a NAS DATA PDU, where the NAS DATA PDU carries the uplink data and an EBI, and the control plane service request is a type of the NAS message and is a control plane message.

Step 1602. The gNB sends an initial UE message to an AMF through an N2 interface.

For example, the initial UE message carries the control plane service request. The control plane service request is a type of the NAS message and carries the NAS DATA PDU, where the NAS DATA PDU carries the uplink data and the EBI.

Step 1603. The AMF determines whether the AMF is overloaded and determines whether an N11 user plane (N11-U) bearer between the AMF and an SMF has been set up.

After receiving the uplink data sent by the terminal device through the service request, the AMF determines, based on all data (for example, uplink and/or downlink data) and all signaling (for example, uplink and/or downlink signaling) that are currently received, and a processing capability of the AMF, whether the processing capability of the AMF reaches a threshold. For example, the AMF determines whether a computing resource or a storage resource that has been used by the AMF is greater than or equal to a first threshold (for example, equal to a largest value) or the AMF determines whether a computing resource or storage resource available to the AMF is less than or equal to a second threshold.

If the AMF determines that the processing capability of the AMF reaches the threshold, for example, the AMF determines that the computing resource or the storage resource that has been used by the AMF is greater than or equal to the first threshold (for example, equal to the largest value) or the AMF determines that the computing resource or storage resource available to the AMF is less than or equal to the second threshold, it is determined that the AMF is overloaded. If the AMF determines that the processing capability of the AMF does not reach the threshold, for example, the AMF determines that the computing resource or the storage resource that has been used by the AMF is less than the first threshold (for example, does not reach the largest value) or the AMF determines that the computing resource or storage resource available to the AMF is greater than the second threshold, it is determined that the AMF is not overloaded.

Step 1604. If the AMF is overloaded and the N11-U is not set up, the AMF sends an initial context setup request to the gNB.

The initial context setup request carries a service accept message. The service accept message carries a user plane transmission instruction. The user plane transmission instruction is used to instruct the terminal device to transmit the uplink data through the user plane. To be specific, the user plane transmission instruction is used to instruct the terminal device to transmit, through the user plane, uplink data after the uplink data that is received by the AMF from the terminal device through a control plane when the AMF is overloaded. In an embodiment, the service accept message further carries a back-off timer. The back-off timer is used to instruct the terminal device not to send the NAS message in a time segment specified by the back-off timer.

In an embodiment, a header field or an idle field of the service accept message carries the user plane transmission instruction and the back-off timer.

In an embodiment, the user plane transmission instruction and the back-off timer may be separately carried by different NAS messages.

Step 1605. The terminal device and the gNB set up a data radio bearer.

In a data radio bearer setup process, the gNB sends the user plane transmission instruction and the back-off timer to the terminal device. For example, the terminal device sends a radio bearer setup request to the gNB, and a header field or an idle field of a radio bearer setup complete message sent by the gNB to the terminal device carries the user plane transmission instruction and the back-off timer.

Step 1606. The terminal device transmits the uplink data through the user plane.

For example, after receiving the user plane transmission instruction, the terminal device determines, based on the user plane transmission instruction, to transmit the uplink data through the user plane. The terminal device sends uplink data after the uplink data that is received by the AMF from the terminal device through the control plane when the AMF is overloaded, to the gNB through the data radio bearer, until transmission of uplink data that needs to be transmitted by the terminal device is completed or the terminal device and the AMF set up a PDN connection again.

Step 1607. The gNB sends an initial context setup complete message (Init context setup complete message) to the AMF.

Step 1608. The AMF sends a modify bearer request to a UPF.

The AMF sends the modify bearer request to the UPF. The modify bearer request is used to request to set up an N3 user plane (N3-U) bearer between the gNB and the UPF. The modify bearer request carries the uplink data that is received from the terminal device through the control plane but that is not sent to the SMF when the AMF is overloaded, an address of the gNB, and a tunnel identifier of the gNB. For example, the modify bearer request carries, through a header field or an idle field of the modify bearer request, the uplink data that is received from the terminal device through the control plane but that is not sent to the SMF when the AMF is overloaded.

Step 1609. The UPF sends a modify bearer response to the AMF.

After the AMF receives the modify bearer response, the N3-U bearer between the gNB and the UPF is set up.

The gNB sends the received uplink data to the UPF through the N3-U bearer between the gNB and the UPF, and then the UPF sends the uplink data to a DN.

Step 1610. The DN sends downlink data (Downlink data) to the terminal device through the UPF and the gNB successively.

For example, the DN sends the downlink data to the UPF, and the UPF sends the downlink data to the gNB through the N3-U bearer.

Figure 17:
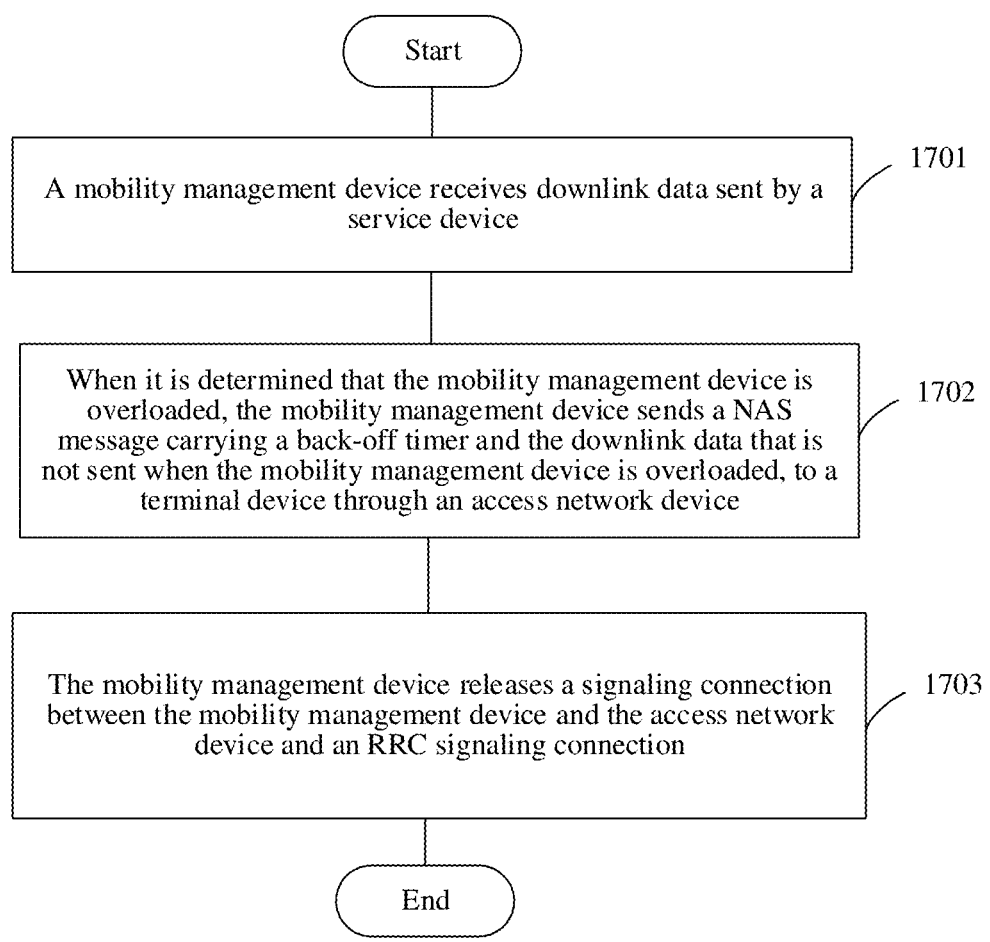
FIG. 17 is a schematic flowchart of a data processing method according to an embodiment.

In an embodiment, the back-off timer may alternatively be sent in another manner. For example, FIG. 17 is a schematic flowchart of a data processing method according to an embodiment. The data processing method of this embodiment may be applicable to various communications systems, for example, an LTE communications system and a new radio access network.

Step 1701. A mobility management device receives downlink data sent by a service device.

In this embodiment, a user plane bearer between the mobility management device and the service device has been set up, and the mobility management device receives, through the user plane bearer, the downlink data sent by the service device.

Step 1702. When it is determined that the mobility management device is overloaded, the mobility management device sends a NAS message carrying a back-off timer and the downlink data that is not sent when the mobility management device is overloaded, to a terminal device through an access network device.

After receiving uplink data, the downlink data, and/or uplink and downlink control signaling, the mobility management device determines whether a processing capability of the mobility management device reaches a threshold. For example, the mobility management device determines whether a computing resource or a storage resource that has been used by the mobility management device is greater than or equal to a first threshold (for example, equal to a largest value) or the mobility management device determines whether a computing resource or storage resource available to the mobility management device is less than or equal to a second threshold.

If the mobility management device determines that the processing capability of the mobility management device reaches the threshold, for example, the mobility management device determines that the computing resource or the storage resource that has been used by the mobility management device is greater than or equal to the first threshold (for example, equal to the largest value) or the mobility management device determines that the computing resource or storage resource available to the mobility management device is less than or equal to the second threshold, it is determined that the mobility management device is overloaded. If the mobility management device determines that the processing capability of the mobility management device does not reach the threshold, for example, the mobility management device determines that the computing resource or the storage resource that has been used by the mobility management device is less than the first threshold (for example, does not reach the largest value) or the mobility management device determines that the computing resource or storage resource available to the mobility management device is greater than the second threshold, it is determined that the mobility management device is not overloaded.

The mobility management device sends a DL S1-AP message to the access network device, where the DL S1-AP message carries the back-off timer and the downlink data that is not sent when the mobility management device is overloaded. For example, the DL S1-AP message may be a downlink NAS transport (downlink NAS transport) message. The access network device sends the back-off timer and the downlink data that is not sent when the mobility management device is overloaded, to the terminal device through an RRC downlink message (RRC DL message). For example, the access network device sends a downlink RRC direct transfer (Downlink RRC direct transfer) message to the terminal device. The downlink RRC direct transfer message carries the back-off timer and the downlink data that is not sent when the mobility management device is overloaded.

Step 1703. The mobility management device releases a signaling connection between the mobility management device and the access network device and an RRC signaling connection.

Figure 18:
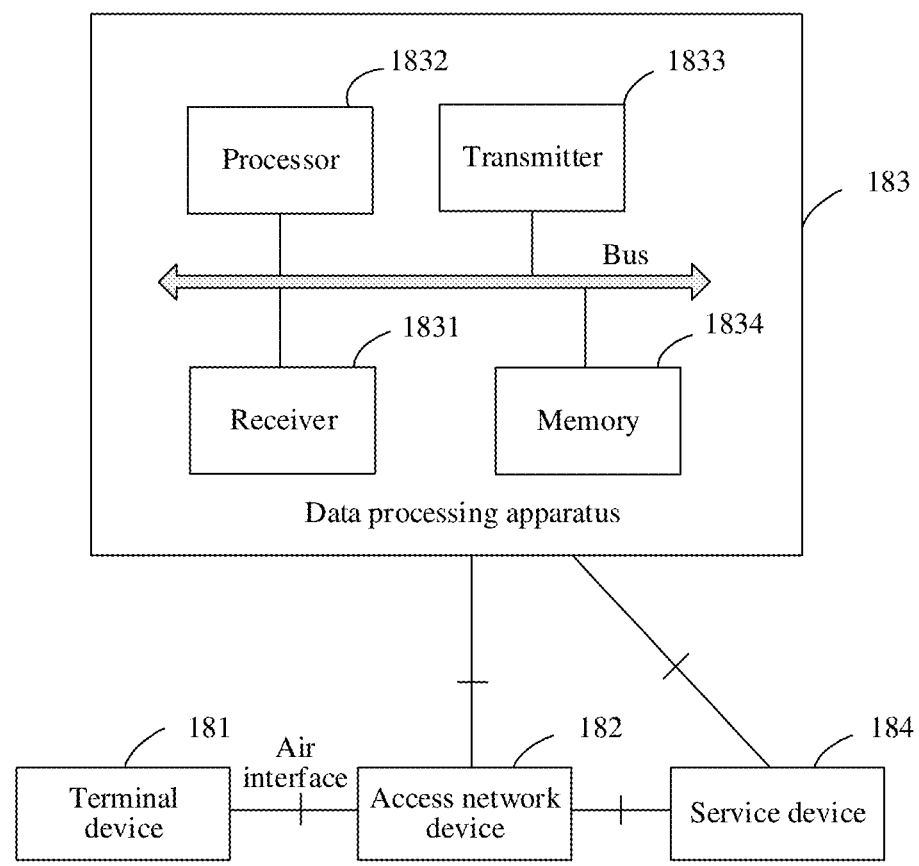
FIG. 18 is a schematic structural diagram of a communications system according to an embodiment.

FIG. 18 is a schematic structural diagram of a communications system according to an embodiment. The communications system may be a 2G, 3G, or 4G communications system or a new radio access network, for example, a GSM system, a CDMA system, a TDMA system, a WCDMA system, an FDMA system, an OFDMA system, an SC-FDMA system, a GPRS system, an LTE system, a UMTS network, a new radio access network, and other communications systems of this type. The new radio access network is also referred to as a 5G network, a next generation network, and the like.

The communications system may include a terminal device 181, an access network device 182, a data processing apparatus 183, and a service device 184. The access network device 182 may be a base station in the 2G, 3G, or 4G communications system or a gNB in a 5G communications system. Because standards of the communications systems are different (that is, access technologies are different), terms of devices and terms of interfaces between the devices are also different. For example, the data processing apparatus 183 may be a mobility management device; in an LTE communications system, the access network device 182 is an eNB, the data processing apparatus 183 is an MME, and the service device 184 is an S-GW. For another example, in the new radio access network, the access network device 182 is the gNB, and the data processing apparatus 183 is an AMF entity. The service device 184 includes an SMF entity and a UPF entity. A network architecture and an interface of the LTE communications system and the new radio access network are specifically shown in FIG. 5 and FIG. 6.

The terminal device 181 may be an IoT device such as a water meter and a power meter.

The data processing apparatus 183 includes: a receiver 1831, a processor 1832, a transmitter 1833, and a memory 1834, where the receiver 1831, the processor 1832, the transmitter 1833, and the memory 1834 communicate with each other through a bus.

In this embodiment of this application, the processor 1832 may be an EPLD, an FPGA, a DSP chip, an ASIC, another programmable logic device, a discrete gate, a transistor logic device, a discrete hardware component, or the like.

The memory 1834 is configured to store a code or instruction information, and may further store information about a device type. The memory 1834 may include a ROM and a RAM, to provide an instruction and data for the processor 1832. A part of the memory 1834 may further include a non-volatile random access memory.

The receiver 1831 is configured to receive downlink data sent by the service device 184.

In this embodiment, a user plane bearer between the data processing apparatus 183 and the service device 184 has been set up, and the receiver 1831 receives, through the user plane bearer, the downlink data sent by the service device 184.

The processor 1832 is configured to determine whether the processor 1832 is overloaded.

The transmitter 1833 is configured to send a NAS message carrying a back-off timer and the downlink data that is not sent when the mobility management device is overloaded, to the terminal device 181 through the access network device 182.

After the receiver 1831 receives uplink data, the downlink data, and/or uplink and downlink control signaling, the processor 1832 determines whether a processing capability of the processor 1832 reaches a threshold. For example, the processor 1832 determines whether a computing resource or a storage resource that has been used by the processor 1832 is greater than or equal to a first threshold (for example, equal to a largest value) or the processor 1832 determines whether a computing resource or storage resource available to the processor 1832 is less than or equal to a second threshold.

If the processor 1832 determines that the processing capability of the processor 1832 reaches the threshold, for example, the processor 1832 determines that the computing resource or the storage resource that has been used by the processor 1832 is greater than or equal to the first threshold (for example, equal to the largest value) or the processor 1832 determines that the computing resource or storage resource available to the processor 1832 is less than or equal to the second threshold, it is determined that the processor 1832 is overloaded. If the processor 1832 determines that the processing capability of the processor 1832 does not reach the threshold, for example, the processor 1832 determines that the computing resource or the storage resource that has been used by the processor 1832 is less than the first threshold (for example, does not reach the largest value) or the processor 1832 determines that the computing resource or storage resource available to the processor 1832 is greater than the second threshold, it is determined that the processor 1832 is not overloaded.

The transmitter 1833 sends a DL S1-AP message to the access network device 182, where the DL S1-AP message carries the back-off timer and the downlink data that is not sent when it is determined that the processor 1832 is overloaded. For example, the DL S1-AP message may be a downlink NAS transport message. The access network device 182 sends the back-off timer and the downlink data that is not sent when the data processing apparatus 183 is overloaded, to the terminal device 181 through an RRC downlink message (RRC DL message). For example, the access network device 182 sends a downlink RRC direct transfer message to the terminal device 181. The downlink RRC direct transfer message carries the back-off timer and the downlink data that is not sent when the data processing apparatus 183 is overloaded.

The processor 1832 is further configured to release a signaling connection between the mobility management device and the access network device and an RRC signaling connection.

Figure 19:
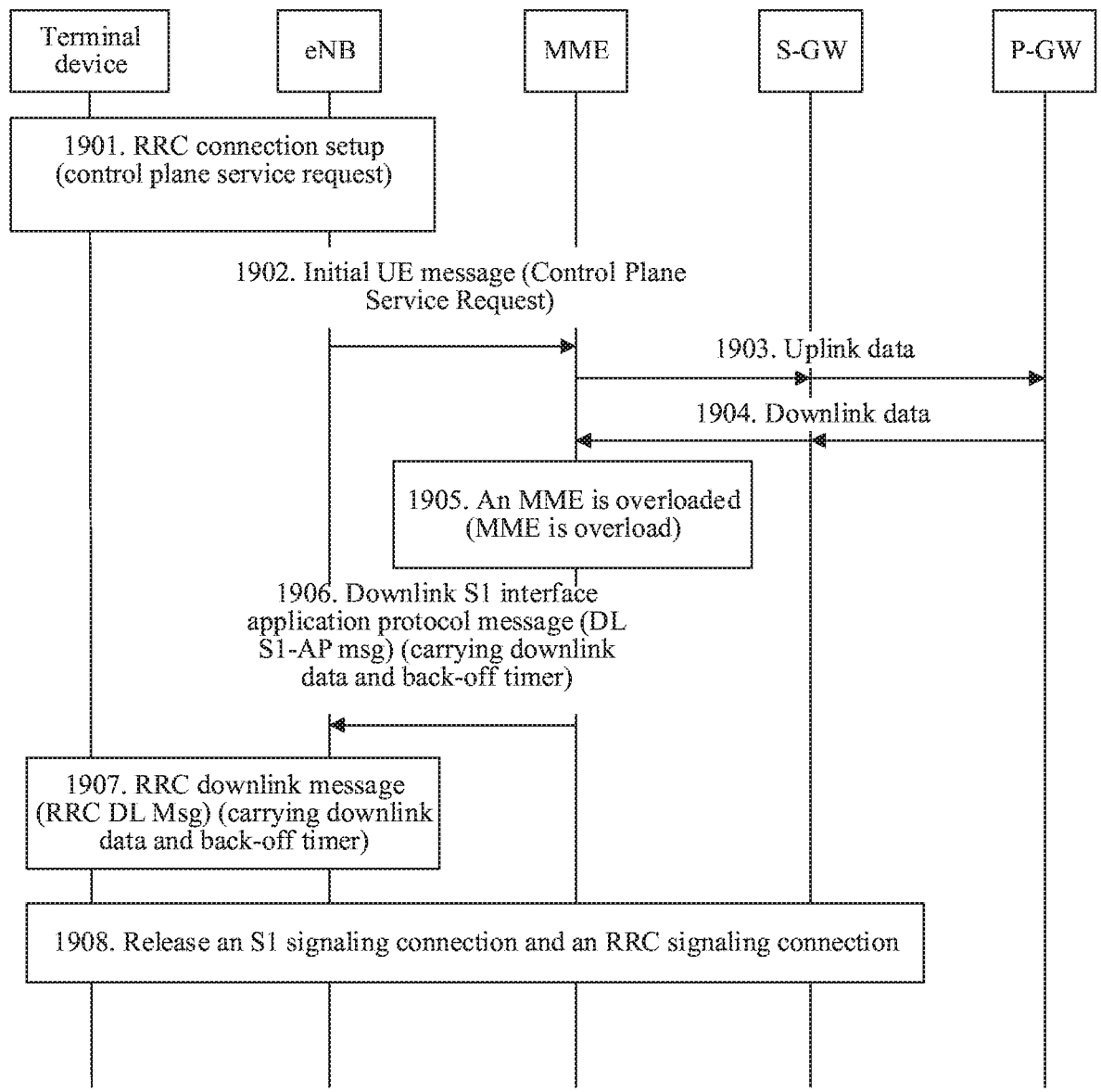
FIG. 19 is a schematic flowchart of a data processing method in an LTE communications system according to an embodiment.

FIG. 19 is a schematic flowchart of a data processing method in an LTE communications system according to an embodiment. In this embodiment, an S11-U bearer between an MME and an S-GW has been set up.

Step 1901. A radio resource control (RRC) connection is set up between a terminal device in an idle state and an eNB, and the terminal device sends uplink data to the eNB by using a NAS message in an RRC connection setup process.

The terminal device in the idle state sends a control plane service request to the eNB in the RRC connection setup process. The control plane service request carries a NAS DATA PDU, where the NAS DATA PDU carries the uplink data and an EBI, and the control plane service request is a type of the NAS message and is a control plane message.

Step 1902. The eNB sends an initial UE message to an MME through an S1-MME interface.

For example, the initial UE message carries a control plane service request, where the control plane service request is a type of the NAS message and carries the NAS DATA PDU. The NAS DATA PDU carries the uplink data and the EBI.

Step 1903. The MME sends the uplink data to an S-GW through an S11-U bearer, and the S-GW forwards the uplink data to a P-GW.

In this embodiment, the S11-U bearer has been set up between the MME and the S-GW, and the MME sends the uplink data to the S-GW through the S11-U bearer.

Step 1904. The MME receives, through the S11-U bearer, the downlink data sent by the P-GW through the S-GW.

Step 1905. The MME determines whether the MME is overloaded.

After receiving the uplink data, the downlink data, and/or uplink and downlink control signaling, the MME determines whether a processing capability of the MME reaches a threshold. For example, the MME determines whether a computing resource or a storage resource that has been used by the MME is greater than or equal to a first threshold (for example, equal to a largest value) or the MME determines whether a computing resource or storage resource available to the MME is less than or equal to a second threshold.

If the MME determines that the processing capability of the MME reaches the threshold, for example, the MME determines that the computing resource or the storage resource that has been used by the MME is greater than or equal to the first threshold (for example, equal to the largest value) or the MME determines that the computing resource or storage resource available to the MME is less than or equal to the second threshold, it is determined that the MME is overloaded. If the MME determines that the processing capability of the MME does not reach the threshold, for example, the MME determines that the computing resource or the storage resource that has been used by the MME is less than the first threshold (for example, does not reach the largest value) or the MME determines that the computing resource or storage resource available to the MME is greater than the second threshold, it is determined that the MME is not overloaded.

Step 1906. The MME sends a NAS message carrying a back-off timer (back-off timer) and the downlink data that is not sent when the MME is overloaded, to the eNB through an S1-MME interface.

For example, the MME sends a downlink S1-AP message (DL S1-AP message) to the eNB through the S1-MME interface. For example, the DL S1-AP message may be a downlink NAS transport (downlink NAS transport) message. The DL S1-AP message carries the back-off timer and the downlink data that is not sent when the MME is overloaded. For example, a header field or an idle field of the DL S1-AP message carries the back-off timer and the downlink data that is not sent when the MME is overloaded. The back-off timer is used to instruct the terminal device not to send the NAS message in a time segment specified by the back-off timer.

Step 1907. The eNB forwards the back-off timer and the downlink data that is not sent when the MME is overloaded, to the terminal device.

For example, the eNB sends an RRC downlink message (RRC DL message) to the terminal device. For example, the RRC DL message may be a downlink RRC direct transfer message. The RRC DL message carries the back-off timer and the downlink data that is not sent when the MME is overloaded. For example, a header field or an idle field of the RRC DL message carries the back-off timer and the downlink data that is not sent when the MME is overloaded.

Step 1908. The MME releases an S1 signaling connection and an RRC signaling connection.

In this embodiment, after sending the uplink data and/or the downlink data, the MME releases the S1 signaling connection and the RRC signaling connection. The releasing the S1 signaling connection includes releasing an S1-MME control plane bearer and the S1-U bearer.

Figure 20:
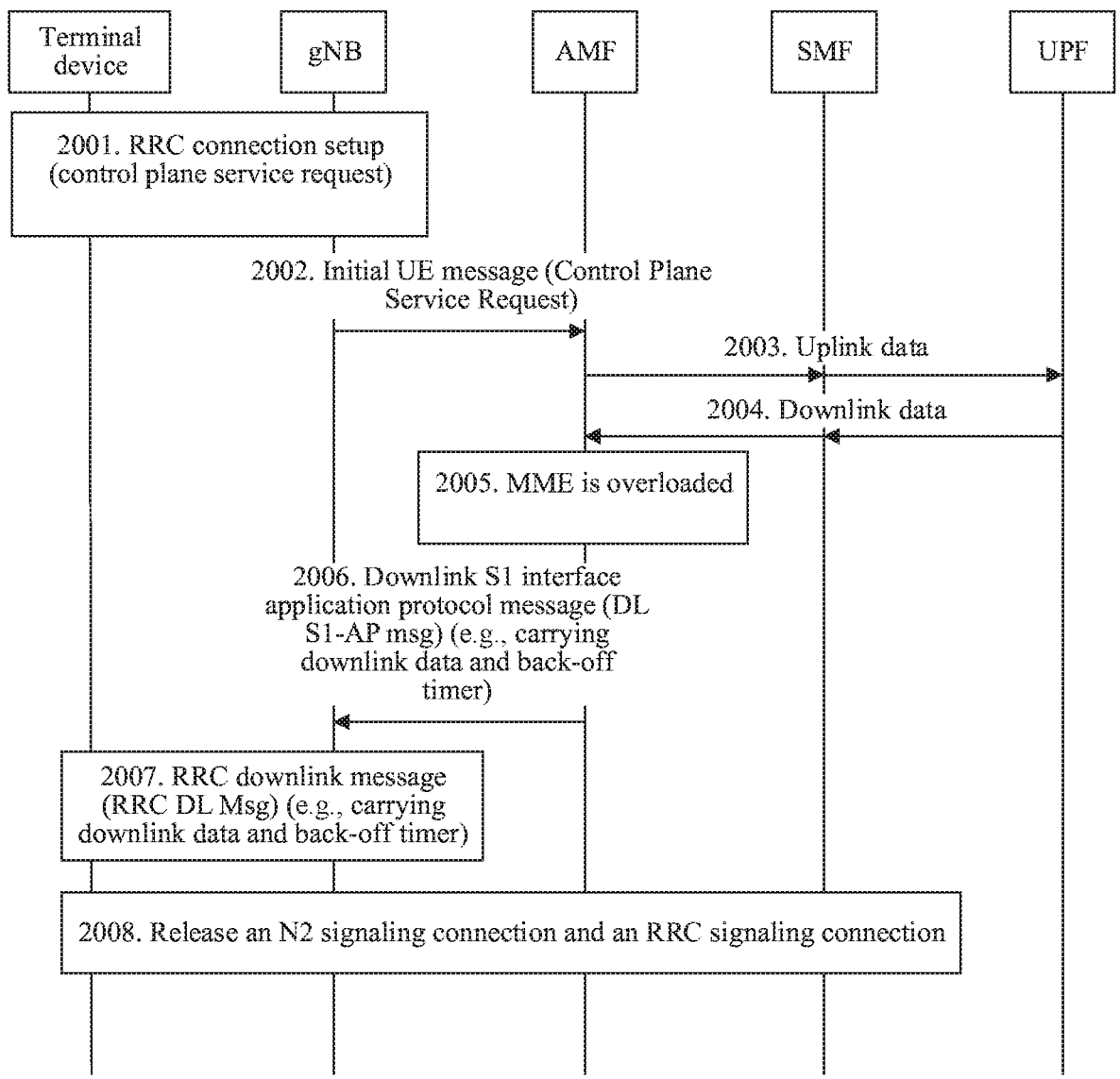
FIG. 20 is a schematic flowchart of a data processing method in a new radio access network according to an embodiment.

For example, FIG. 20 is a schematic flowchart of a data processing method in a new radio access network according to an embodiment. In this embodiment, an N11-U bearer between an AMF and an SMF has been set up.

Step 2001. A radio resource control (RRC) connection is set up between a terminal device in an idle state and a gNB, and the terminal device sends uplink data to an eNB by using a NAS message in an RRC connection setup process.

The terminal device in the idle state sends a control plane service request to the gNB in the RRC connection setup process. The control plane service request carries a NAS DATA PDU, where the NAS DATA PDU carries the uplink data and an EBI, and the control plane service request is a type of a NAS message and is a control plane message.

Step 2002. The gNB sends an initial UE message to an AMF through an N2 interface.

For example, the initial UE message carries the control plane service request, where the control plane service request is a type of the NAS message and carries the NAS DATA PDU. The NAS DATA PDU carries the uplink data and the EBI.

Step 2003. The AMF sends the uplink data to an SMF through an N11-U bearer, and the SMF forwards the uplink data to a UPF.

In this embodiment, the N11-U bearer has been set up between the AMF and the SMF, and the AMF sends the uplink data to the SMF through the N11-U bearer.

Step 2004. The AMF receives, through the N11-U bearer, downlink data sent by a DN through a UPF and the SMF successively.

Step 2005. The AMF determines whether the AMF is overloaded.

After receiving the uplink data, the downlink data, and/or uplink and downlink control signaling, the AMF determines whether a processing capability of the AMF reaches a threshold. For example, the AMF determines whether a computing resource or a storage resource that has been used by the AMF is greater than or equal to a first threshold (for example, equal to a largest value) or the AMF determines whether a computing resource or storage resource available to the AMF is less than or equal to a second threshold.

If the AMF determines that the processing capability of the AMF reaches the threshold, for example, the AMF determines that the computing resource or the storage resource that has been used by the AMF is greater than or equal to the first threshold (for example, equal to the largest value) or the AMF determines that the computing resource or storage resource available to the AMF is less than or equal to the second threshold, it is determined that the AMF is overloaded. If the AMF determines that the processing capability of the AMF does not reach the threshold, for example, the AMF determines that the computing resource or the storage resource that has been used by the AMF is less than the first threshold (for example, does not reach the largest value) or the AMF determines that the computing resource or storage resource available to the AMF is greater than the second threshold, it is determined that the AMF is not overloaded.

Step 2006. The AMF sends a back-off timer and the downlink data that is not sent when the AMF is overloaded, to the gNB through an N2 interface.

For example, the AMF sends a downlink S1-AP message (DL S1-AP message) to the gNB through the N2 interface. For example, the DL S1-AP message may be a downlink NAS transport message. The DL S1-AP message carries the back-off timer and the downlink data that is not sent when the AMF is overloaded. For example, a header field or an idle field of the DL S1-AP message carries the back-off timer and the downlink data that is not sent when the AMF is overloaded. The back-off timer is used to instruct the terminal device not to send the NAS message in a time segment specified by the back-off timer.

Step 2007. The gNB forwards the back-off timer and the downlink data that is not sent when the AMF is overloaded, to the terminal device.

For example, the gNB sends an RRC downlink message (RRC DL message) to the terminal device. For example, the RRC DL message may be a downlink RRC direct transfer message. The RRC DL message carries the back-off timer and the downlink data that is not sent when the AMF is overloaded. For example, a header field or an idle field of the RRC DL message carries the back-off timer and the downlink data that is not sent when the AMF is overloaded.

Step 2008. The AMF releases an N2 signaling connection and an RRC signaling connection.

In this embodiment, after sending the uplink data and/or the downlink data, the AMF releases the N2 signaling connection and the RRC signaling connection. The releasing an N2 signaling connection includes releasing an N2 interface user plane bearer and an N3-U bearer.

Figure 21:
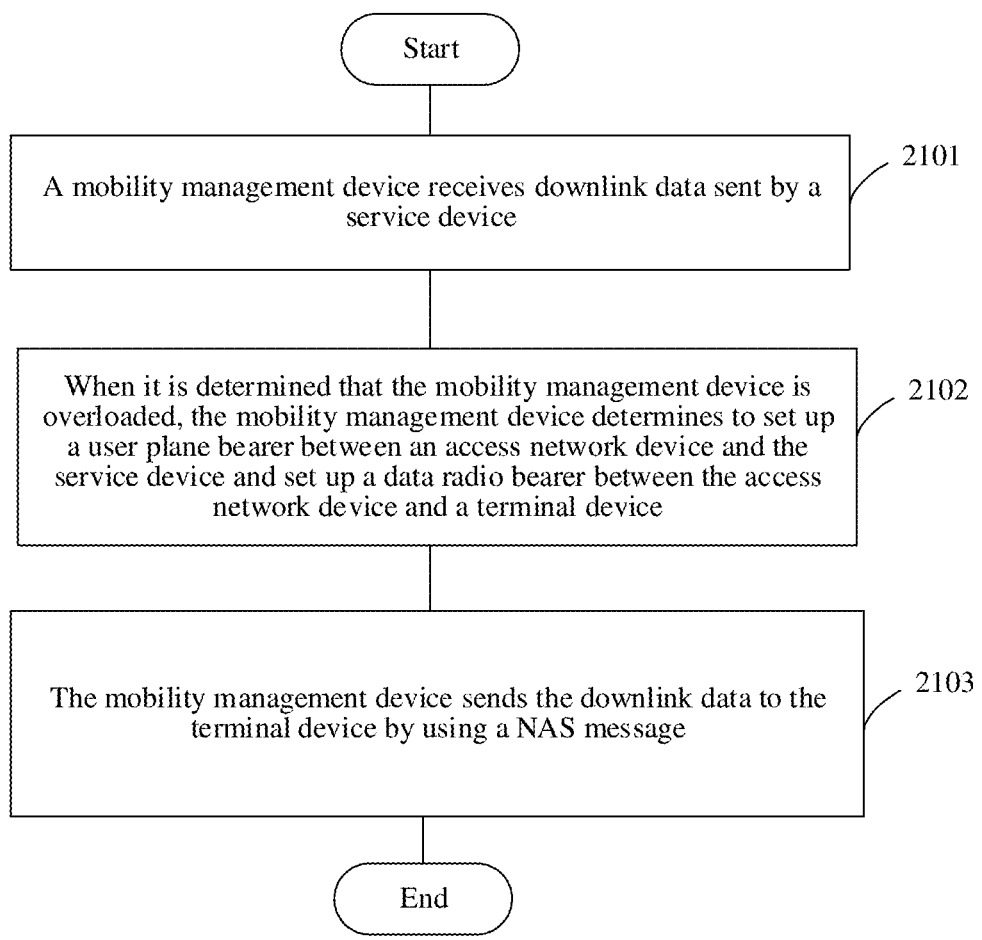
FIG. 21 is a schematic flowchart of a data processing method according to an embodiment.

In an embodiment, the downlink data may alternatively be sent in another manner. For example, FIG. 21 is a schematic flowchart of a data processing method according to an embodiment. The data processing method of this embodiment may be applicable to various communications systems, for example, an LTE communications system and a new radio access network.

Step 2101. A mobility management device receives downlink data sent by a service device.

In this embodiment, a user plane bearer between the mobility management device and the service device has been set up, and the mobility management device receives, through the user plane bearer, the downlink data sent by the service device.

Step 2102. When it is determined that the mobility management device is overloaded, the mobility management device initiates to set up a user plane bearer between an access network device and the service device and set up a data radio bearer between the access network device and the terminal device.

Step 2103. The mobility management device sends the downlink data that is not sent when the mobility management device is overloaded, to the terminal device by using a NAS message.

For example, after receiving uplink data, the downlink data, and/or uplink and downlink control signaling, the mobility management device determines whether a processing capability of the mobility management device reaches a threshold. For example, the mobility management device determines whether a computing resource or a storage resource that has been used by the mobility management device is greater than or equal to a first threshold (for example, equal to a largest value) or the mobility management device determines whether a computing resource or storage resource available to the mobility management device is less than or equal to a second threshold.

If the mobility management device determines that the processing capability of the mobility management device reaches the threshold, for example, the mobility management device determines that the computing resource or the storage resource that has been used by the mobility management device is greater than or equal to the first threshold (for example, equal to the largest value) or the mobility management device determines that the computing resource or storage resource available to the mobility management device is less than or equal to the second threshold, it is determined that the mobility management device is overloaded. If the mobility management device determines that the processing capability of the mobility management device does not reach the threshold, for example, the mobility management device determines that the computing resource or the storage resource that has been used by the mobility management device is less than the first threshold (for example, does not reach the largest value) or the mobility management device determines that the computing resource or storage resource available to the mobility management device is greater than the second threshold, it is determined that the mobility management device is not overloaded.

When it is determined that the mobility management device is overloaded, the mobility management device initiates to set up the user plane bearer between the access network device and the service device and set up the data radio bearer between the access network device and the terminal device.

For example, the mobility management device sends an initial context setup request to the access network device. The initial context setup request is used to request to set up the user plane bearer between the access network device and the service device. The initial context setup request is a type of the NAS message, and the initial context setup request carries the downlink data that is not sent when the mobility management device is overloaded. In an embodiment, the mobility management device sends the initial context setup request to the access network device after receiving a service request sent by the access network device.

After receiving a radio bearer setup request (Radio Bearers Setup Request) sent by the terminal device, the access network device sends a radio bearer setup complete message to the terminal device. The radio bearer setup complete message is a type of the NAS message and carries the downlink data that is not sent when the mobility management device is overloaded.

In an embodiment, the initial context setup request and the radio bearer setup complete message further carry a back-off timer.

In an embodiment, the initial context setup request and the radio bearer setup complete message carry the downlink data and the back-off timer through a header field or an idle field.

In an embodiment, the mobility management device further initiates a process of releasing the user plane bearer between the mobility management device and the service device. For example, the mobility management device sends a release access bearer request to the service device, and then the mobility management device receives a release access bearer response sent by the service device.

Figure 22:
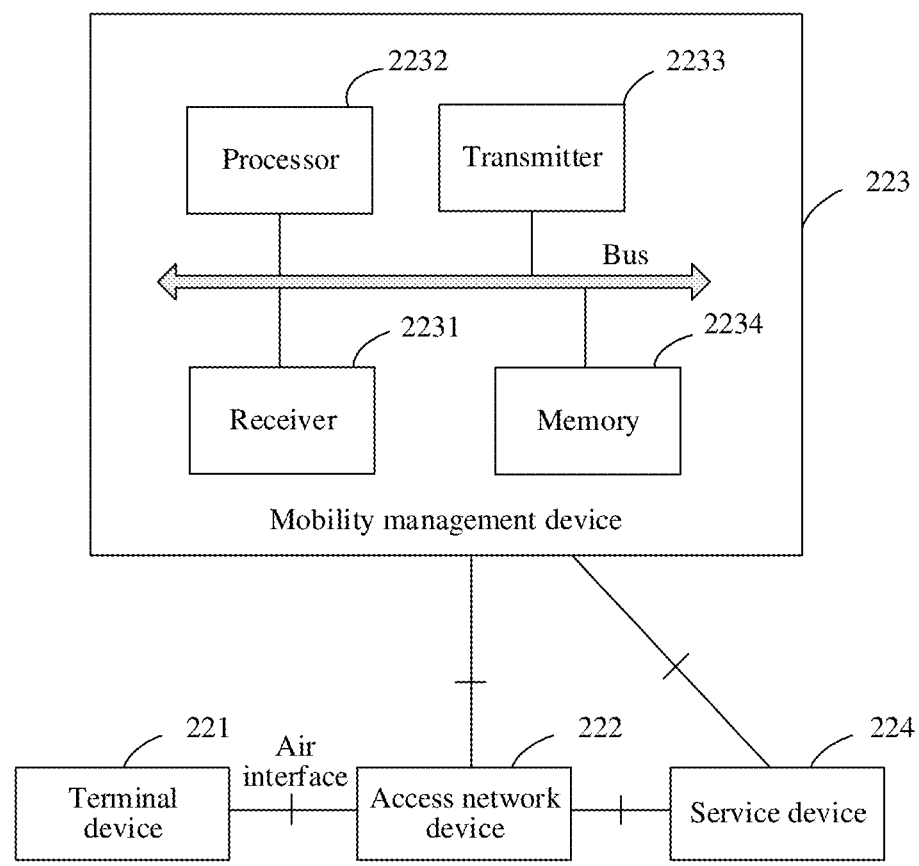
FIG. 22 is a schematic structural diagram of a communications system according to an embodiment.

FIG. 22 is a schematic structural diagram of a communications system according to an embodiment. The communications system may be a 2G, 3G, or 4G communications system or a new radio access network, for example, a GSM system, a CDMA system, a TDMA system, a WCDMA system, an FDMA system, an OFDMA system, an SC-FDMA system, a GPRS system, an LTE system, a UMTS network, a new radio access network, and other communications systems of this type. The new radio access network is also referred to as a 5G network, a next generation network, and the like.

The communications system may include a terminal device 221, an access network device 222, a data processing apparatus 223, and a service device 224. The access network device 222 may be a base station in the 2G, 3G, or 4G communications system or a gNB in a 5G communications system. Because standards of the communications systems are different (that is, access technologies are different), terms of devices and terms of interfaces between the devices are also different. For example, the data processing apparatus 223 may be a mobility management device; in an LTE communications system, the access network device 222 is an eNB, the data processing apparatus 223 is an MME, and the service device 224 is an S-GW. For another example, in the new radio access network, the access network device 222 is the gNB, and the data processing apparatus 223 is an AMF entity. The service device 224 includes an SMF entity and a UPF entity. A network architecture and an interface of the LTE communications system and the new radio access network are specifically shown in FIG. 5 and FIG. 6.

The terminal device 221 may be an IoT device such as a water meter and a power meter.

The data processing apparatus 223 includes: a receiver 2231, a processor 2232, a transmitter 2233, and a memory 2234, where the receiver 2231, the processor 2232, the transmitter 2233, and the memory 2234 communicate with each other through a bus.

In this embodiment of this application, the processor 2232 may be an EPLD, an FPGA, a DSP chip, an ASIC, another programmable logic device, a discrete gate, a transistor logic device, a discrete hardware component, or the like.

The memory 2234 is configured to store a code or instruction information, and may further store information about a device type. The memory 2234 may include a ROM and a RAM, to provide an instruction and data for the processor 2232. A part of the memory 2234 may further include a non-volatile random access memory.

The receiver 2231 is configured to receive downlink data sent by the service device 224.

In this embodiment, a user plane bearer between the data processing apparatus 223 and the service device 224 has been set up, and the receiver 2231 is configured to receive, through the user plane bearer, the downlink data sent by the service device 224.

When it is determined that the processor 2232 is overloaded, the processor 2232 is configured to determine to set up a user plane bearer between the access network device 222 and the service device 224 and set up a data radio bearer between the access network device 222 and the terminal device 221.

The transmitter 2233 is configured to send downlink data that is not sent by the transmitter 2233 when it is determined that the processor 2232 is overloaded, to the terminal device 221 by using a NAS message.

For example, after the receiver 2231 receives uplink data, the downlink data, and/or uplink and downlink control signaling, the processor 2232 determines whether a processing capability of the processor 2232 reaches a threshold. For example, the processor 2232 determines whether a computing resource or a storage resource that has been used by the processor 2232 is greater than or equal to a first threshold (for example, equal to a largest value) or the processor 2232 determines whether a computing resource or storage resource available to the processor 2232 is less than or equal to a second threshold.

If the processor 2232 determines that the processing capability of the processor 2232 reaches the threshold, for example, the processor 2232 determines that the computing resource or the storage resource that has been used by the processor 2232 is greater than or equal to the first threshold (for example, equal to the largest value) or the processor 2232 determines that the computing resource or storage resource available to the processor 2232 is less than or equal to the second threshold, it is determined that the processor 2232 is overloaded. If the processor 2232 determines that the processing capability of the processor 2232 does not reach the threshold, for example, the processor 2232 determines that the computing resource or the storage resource that has been used by the processor 2232 is less than the first threshold (for example, does not reach the largest value) or the processor 2232 determines that the computing resource or storage resource available to the processor 2232 is greater than the second threshold, it is determined that the processor 2232 is not overloaded.

For example, the transmitter 2233 sends an initial context setup request (Initial context setup request) to the access network device 222. The initial context setup request is used to request to set up the user plane bearer between the access network device 222 and the service device 224. The initial context setup request is a type of the NAS message, and the initial context setup request carries the downlink data that is not sent by the transmitter 2233 when it is determined that the processor 2232 is overloaded. In an embodiment, the transmitter 2233 sends the initial context setup request to the access network device 222 after the receiver 2231 receives a service request sent by the access network device 222.

After the receiver 2231 receives a radio bearer setup request sent by the terminal device, the transmitter 2233 sends a radio bearer setup complete message to the terminal device 221. The radio bearer setup complete message is a type of the NAS message and carries the downlink data that is not sent by the transmitter 2233 when it is determined that the processor 2232 is overloaded.

In an embodiment, the initial context setup request and the radio bearer setup complete message further carry a back-off timer.

In an embodiment, the initial context setup request and the radio bearer setup complete message carry the downlink data and the back-off timer through a header field or an idle field.

In an embodiment, the processor 2232 is further configured to release the user plane bearer between the data processing apparatus 223 and the service device 224. For example, the transmitter 2233 sends a release access bearer request to the service device 224, and then the receiver 2231 receives a release access bearer response sent by the service device 224.

Figure 23:
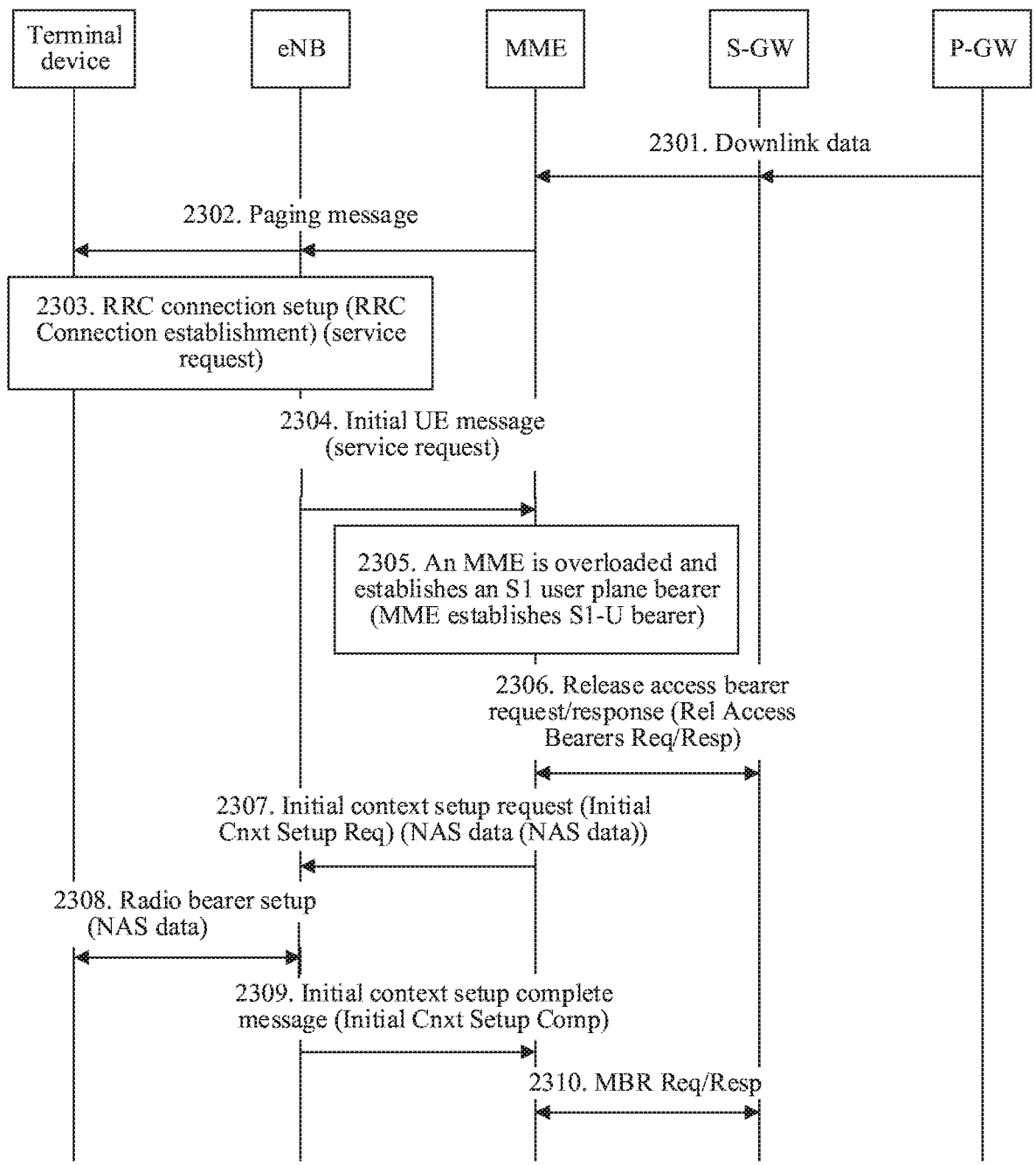
FIG. 23 is a schematic flowchart of a data processing method in an LTE communications system according to an embodiment.

FIG. 23 is a schematic flowchart of a data processing method in an LTE communications system according to an embodiment. In this embodiment, an S11-U bearer between an MME and an S-GW has been set up.

Step 2301. The MME receives, through the S11-U bearer, downlink data sent by a P-GW through the S-GW.

Step 2302. The MME sends a paging message to an eNB through an S1-MME interface, and sends the paging message to a terminal device through the eNB.

Step 2303. The terminal device responds to the paging message, and sends an RRC connection setup request to the eNB.

The RRC connection setup request carries a control plane service request (Service request), where the control plane service request is a type of a NAS message and carries a NAS DATA PDU. The NAS DATA PDU carries uplink data and an EBI.

Step 2304. The eNB sends an initial UE message to the MME.

The initial UE message carries the control plane service request, where the control plane service request is a type of the NAS message and carries the NAS DATA PDU. The NAS DATA PDU carries the uplink data and the EBI.

Step 2305. The MME determines whether the MME is overloaded. If the MME is overloaded, the MME determines to set up an S1-U bearer between the eNB and the S-GW.

After receiving the uplink data, the downlink data, and/or uplink and downlink control signaling, the MME determines whether a processing capability of the MME reaches a threshold. For example, the MME determines whether a computing resource or a storage resource that has been used by the MME is greater than or equal to a first threshold (for example, equal to a largest value) or the MME determines whether a computing resource or storage resource available to the MME is less than or equal to a second threshold.

If the MME determines that the processing capability of the MME reaches the threshold, for example, the MME determines that the computing resource or the storage resource that has been used by the MME is greater than or equal to the first threshold (for example, equal to the largest value) or the MME determines that the computing resource or storage resource available to the MME is less than or equal to the second threshold, it is determined that the MME is overloaded. If the MME determines that the processing capability of the MME does not reach the threshold, for example, the MME determines that the computing resource or the storage resource that has been used by the MME is less than the first threshold (for example, does not reach the largest value) or the MME determines that the computing resource or storage resource available to the MME is greater than the second threshold, it is determined that the MME is not overloaded.

If the MME is overloaded, the MME determines to set up an S1-U bearer between the eNB and the S-GW.

Step 2306. The MME releases the S11-U bearer between the MME and the S-GW.

For example, the MME sends a release access bearer request to the S-GW. The release access bearer request is used to request to release the S11-U bearer between the MME and the S-GW. The MME receives a release access bearer response sent by the S-GW, and then the S11-U bearer is released.

Step 2307. The MME sends an initial context setup request (Initial context setup request) to the eNB.

For example, the initial context setup request is a type of the NAS message, to request to set up the S1-U bearer between the eNB and the S-GW. The initial context setup request carries downlink data that is not sent when the MME is overloaded. In an embodiment, the initial context setup request further carries a back-off timer.

Step 2308. The eNB and the terminal device set up a radio bearer (Radio Bearers setup).

After receiving a radio bearer setup request sent by the terminal device, the eNB sends a radio bearer setup complete message to the terminal device. The radio bearer setup complete message is a type of a NAS message and carries the downlink data that is not sent when the MME is overloaded. In an embodiment, the radio bearer setup complete message further carries the back-off timer.

Step 2309. The eNB sends an initial context setup complete message (Initial context setup complete message) to the MME.

Step 2310. The user plane bearer is set up between the MME and the S-GW.

The MME sends a create session request to the S-GW. The create session request is used to request to set up the S11 user plane (S11-U) bearer between the MME and the S-GW. After the MME receives a create session response sent by the S-GW, the S11-U bearer between the MME and the S-GW is set up.

It can be learned from the foregoing description that, when the MME is overloaded and the downlink data arrives at the MME, the MME decides to switch to the user plane to transmit the downlink data. When the MME sets up the data radio bearer, the MME sends the downlink data to UE by using the NAS message.

Figure 24:
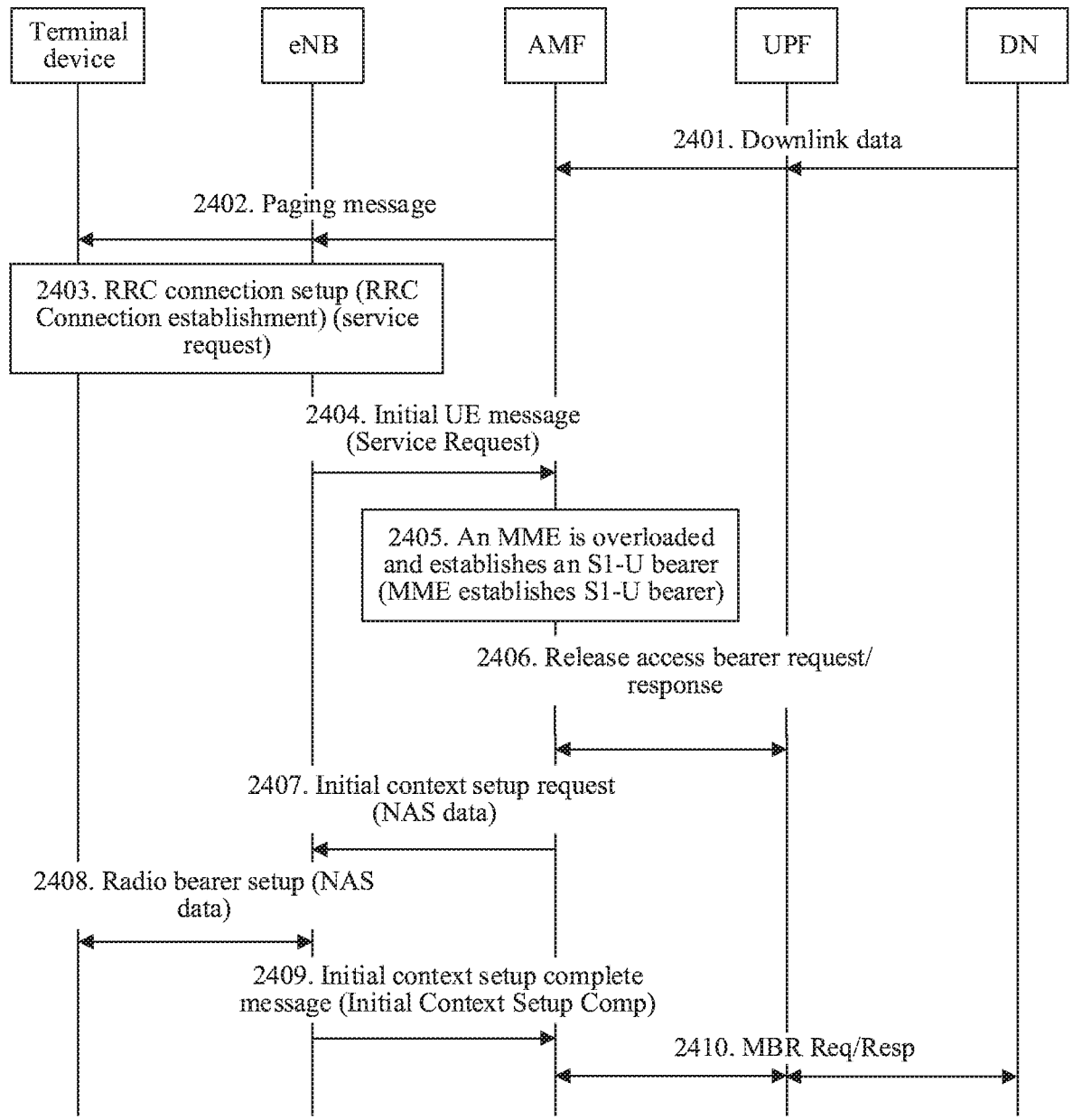
FIG. 24 is a schematic flowchart of a data processing method in a new radio access network according to an embodiment.

FIG. 24 is a schematic flowchart of a data processing method in a new radio access network according to an embodiment. In this embodiment, an N11-U bearer between an AMF and an SMF has been set up.

Step 2401. The AMF receives, through the N11-U bearer, downlink data sent by a UPF through the SMF.

The downlink data received by the UPF is delivered by a DN.

Step 2402. The AMF sends a paging message to a gNB through an N2-AMF interface, and sends the paging message to a terminal device through the gNB.

Step 2403. The terminal device responds to the paging message, and sends an RRC connection setup request to the gNB.

The RRC connection setup request carries a control plane service request (Service request), where the control plane service request is a type of a NAS message and carries a NAS DATA PDU. The NAS DATA PDU carries uplink data and an EBI.

Step 2404. The gNB sends an initial UE message to the AMF.

The initial UE message carries the control plane service request, where the control plane service request is a type of the NAS message and carries the NAS DATA PDU. The NAS DATA PDU carries the uplink data and the EBI.

Step 2405. The AMF determines whether the AMF is overloaded. If the AMF is overloaded, the AMF sets up an N3-U bearer between the gNB and the UPF.

After receiving the uplink data, the downlink data, and/or uplink and downlink control signaling, the AMF determines whether a processing capability of the AMF reaches a threshold. For example, the AMF determines whether a computing resource or a storage resource that has been used by the AMF is greater than or equal to a first threshold (for example, equal to a largest value) or the AMF determines whether a computing resource or storage resource available to the AMF is less than or equal to a second threshold.

If the AMF determines that the processing capability of the AMF reaches the threshold, for example, the AMF determines that the computing resource or the storage resource that has been used by the AMF is greater than or equal to the first threshold (for example, equal to the largest value) or the AMF determines that the computing resource or storage resource available to the AMF is less than or equal to the second threshold, it is determined that the AMF is overloaded. If the AMF determines that the processing capability of the AMF does not reach the threshold, for example, the AMF determines that the computing resource or the storage resource that has been used by the AMF is less than the first threshold (for example, does not reach the largest value) or the AMF determines that the computing resource or storage resource available to the AMF is greater than the second threshold, it is determined that the AMF is not overloaded.

If the AMF is overloaded, the AMF sets up the N3-U bearer between the gNB and the UPF.

Step 2406. The AMF releases the N11-U bearer between the AMF and the SMF.

For example, the AMF sends a release access bearer request (Release Access Bearers Request) to the SMF. The release access bearer request is used to request to release the N11-U bearer between the AMF and the SMF. The AMF receives a release access bearer response sent by the SMF, and the N11-U bearer is released.

Step 2407. The AMF sends an initial context setup request (Initial context setup request) to the gNB.

For example, the initial context setup request is a type of the NAS message, and the initial context setup request carries the downlink data that is not sent when the AMF is overloaded. In an embodiment, the initial context setup request further carries a back-off timer.

Step 2408. The gNB and the terminal device set up a radio bearer (Radio Bearers setup).

After receiving a radio bearer setup request sent by the terminal device, the gNB sends a radio bearer setup complete message to the terminal device. The radio bearer setup complete message is a type of the NAS message and carries the downlink data that is not sent when the AMF is overloaded. In an embodiment, the radio bearer setup complete message further carries the back-off timer.

Step 2409. The gNB sends an initial context setup complete message (Initial context setup complete message) to the AMF.

Step 2410. A user plane bearer is set up between the AMF and the UPF.

It can be learned from the foregoing description that, when the AMF is overloaded and the downlink data arrives at the AMF, the AMF decides to switch to the user plane to transmit the downlink data. When the AMF sets up a data radio bearer, the AMF sends the downlink data to the terminal device by using the NAS message.

In an implementation process, steps in the foregoing methods may be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor. To avoid repetition, details are not described herein again. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It should be understood that sequence numbers of the foregoing processes do not mean execution sequences in various embodiments of this application. The execution sequences of the processes should be determined according to functions and internal logic of the processes, but should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in the present disclosure shall fall within the protection scope of the present disclosure. Therefore, the protection scope of this application shall be subject to the protection scope of the claim.

What is claimed is:

1. A data processing method, comprising:
receiving, by a mobility management device, uplink data sent by a terminal device by using a non-access stratum (NAS) message, and, after the receiving, determining, based on a processing capability of the mobility management device, whether the mobility management device is overloaded;
when said determining determines that the mobility management device is overloaded, instructing, by the mobility management device, the terminal device to transmit the uplink data through a user plane; and
if the mobility management device has a user plane bearer with a service device and the mobility management device receives downlink data from the service device, sending, by the mobility management device, a back-off timer and downlink data that is not sent when the mobility management device is overloaded, to the terminal device by using a second NAS message,
wherein the sending, by the mobility management device, a back-off timer and downlink data that is not sent when the mobility management device is overloaded, to the terminal device by using the second NAS message comprises:
carrying, by the mobility management device by using the second NAS message, the back-off timer and the downlink data, and sending the back-off timer and the downlink data to an access network device, wherein the back-off timer and the downlink data are then sent by the access network device to the terminal device through a radio resource control (RRC) downlink message.

2. The method according to claim 1, further comprising: instructing, by the mobility management device, the terminal device to retransmit, through the user plane, uplink data that is received by the mobility management device from the terminal device through a control plane but that is not sent to a service device when said determining determines that the mobility management device is overloaded.

3. The method according to claim 1, further comprising: sending, by the mobility management device, uplink data that is received from the terminal device through a control plane but that is not sent to a service device when said determining determines that the mobility management device is overloaded, to the service device through a signaling message.

4. The method according to claim 3, wherein the signaling message comprises a modify bearer request message.

5. The method according to claim 1, further comprising: if the mobility management device has a user plane bearer with a service device and the mobility management device receives downlink data from the service device, sending, by the mobility management device, downlink data that is not sent when the mobility management device is overloaded, to the terminal device by using a second NAS message.

6. The method according to claim 5, wherein the sending, by the mobility management device, downlink data that is not sent when the mobility management device is overloaded, to the terminal device by using the second NAS message comprises:
carrying, by the mobility management device through an initial context setup request, the downlink data, and sending the downlink data to an access network device, wherein the downlink data is then sent by the access network device to the terminal device through a radio bearer setup complete message.

7. A non-transitory computer-readable storage medium, comprising a program which, when being executed by a processor of a mobility management device, causes the mobility management device to perform the method according to claim 1.

8. A data processing method, comprising:
sending, by a terminal device, uplink data to a mobility management device by using a non-access stratum (NAS) message;
receiving, by the terminal device, a notification that is sent when the mobility management device determines, based on a processing capability of the mobility management device, that the mobility management device is overloaded;
sending, by the terminal device and in accordance with the received notification, the uplink data to the mobility management device through a user plane; and
receiving in a second NAS message, by the terminal device and from the mobility management device if the mobility management device has a user plane bearer with a service device and the mobility management device receives downlink data from the service device, a back-off timer and downlink data that is not sent when the mobility management device is overloaded,
wherein said receiving the second NAS message from the mobility management device comprises receiving, by the terminal device, the second NAS message from an access network device through a radio resource control (RRC) downlink message.

9. The method according to claim 8, further comprising:
receiving, by the terminal device, a retransmission instruction sent by the mobility management device, wherein the retransmission instruction is used to instruct the terminal device to retransmit, through the user plane, uplink data that is received by the mobility management device from the terminal device through a control plane but that is not sent to a service device when the mobility management device determines, based on a processing capability of the mobility management device, that the mobility management device is overloaded; and
retransmitting, by the terminal device based on the retransmission instruction and through the user plane, the uplink data that is received by the mobility management device from the terminal device through the control plane but that is not sent to the service device when the mobility management device determines that the mobility management device is overloaded.

10. The method according to claim 8, further comprising:
if the mobility management device has set up a user plane bearer with a service device and the mobility management device has received downlink data from the service device, receiving, by the terminal device, downlink data that is sent by the mobility management device by using a second NAS message and that is not sent when the mobility management device determines that the mobility management device is overloaded.

11. A non-transitory computer-readable storage medium, comprising a program which, when being executed by a processor of a terminal device, causes the terminal device to perform the method according to claim 8.

12. A data processing apparatus, comprising at least one processor and a memory coupled to the at least one processor, the at least one processor being configured to:
receive, uplink data sent by a terminal device by using a non-access stratum (NAS) message, and determine, based on a processing capability of a mobility management device, whether the mobility management device is overloaded;
when said determining determines that the mobility management device is overloaded, instruct, the terminal device to transmit the uplink data through a user plane; and
if the mobility management device has a user plane bearer with a service device and the mobility management device receives downlink data from the service device, sending, a back-off timer and downlink data that is not sent when the mobility management device determines that the mobility management device is overloaded, to the terminal device by using the second NAS message,
wherein the sending, a back-off timer and downlink data that is not sent when the mobility management device determines that the mobility management device is overloaded, to the terminal device by using the NAS message, the at least one processor being further configured to:
carrying, by using the NAS message, the back-off timer and the downlink data, and sending the back-off timer and the downlink data to an access network device, wherein the back-off timer and the downlink data are then sent by the access network device to the terminal device through a radio resource control (RRC) downlink message.

13. The apparatus according to claim 12, wherein the at least one processor being further configured to:
instruct, the terminal device to retransmit, through the user plane, uplink data that is received by the mobility management device from the terminal device through a control plane but that is not sent to a service device when the mobility management device determines that the mobility management device is overloaded.

14. The apparatus according to claim 12, wherein the at least one processor is further configured to:
sending, uplink data that is received from the terminal device through a control plane but that is not sent to a service device when the mobility management device determines that the mobility management device is overloaded, to the service device through a signaling message.

15. The apparatus according to claim 14, wherein the signaling message comprises a modify bearer request message.

16. The apparatus according to claim 12, wherein the at least one processor is further configured to:
if the mobility management device has a user plane bearer with a service device and the mobility management device receives downlink data from the service device, sending, downlink data that is not sent when the mobility management device determines that the mobility management device is overloaded, to the terminal device by using a second NAS message.

17. The apparatus according to claim 16, wherein the sending, downlink data that is not sent when the mobility management device determines that the mobility management device is overloaded, to the terminal device by using the second NAS message specifically, the at least one processor being further configured to:

carrying, through an initial context setup request, the downlink data and sending the downlink data to an access network device, wherein the downlink data is then sent by the access network device to the terminal device through a radio bearer setup complete message.

18. A data processing apparatus, comprising at least one processor and a memory coupled to the at least one processor, the at least one processor being configured to:

send, uplink data to a mobility management device by using a non-access stratum (NAS) message;

receive, a notification that is sent when the mobility management device determines, based on a processing capability of the mobility management device, that the mobility management device is overloaded and that is of transmitting the uplink data through a user plane;

send, the uplink data to the mobility management device based on the notification through the user plane;

when the mobility management device has a user plane bearer with a service device and the mobility management device receives downlink data from the service device, receive, a back-off timer and downlink data that is not sent when the mobility management device is overloaded, wherein the back-off timer and the downlink data are sent by the mobility management device by using a second NAS message, wherein said receive the second NAS message from the mobility management device comprises receiving the second NAS message from an access network device through a radio resource control (RRC) downlink message.

19. The apparatus according to claim 18, wherein the at least one processor being further configured to:

receive, a retransmission instruction sent by the mobility management device, wherein the retransmission instruction is used to instruct a terminal device to retransmit, through the user plane, uplink data that is received by the mobility management device from the terminal device through a control plane but that is not sent to a service device when the mobility management device determines that the mobility management device is overloaded; and retransmit, based on the retransmission instruction through the user plane, the uplink data that is received by the mobility management device from the terminal device through the control plane but that is not sent to the service device when the mobility management device determines that the mobility management device is overloaded.

20. The apparatus according to claim 18, wherein the at least one processor being further configured to:

when the mobility management device has a user plane bearer with a service device and the mobility management device receives downlink data from the service device, receive, downlink data that is sent by the mobility management device by using the second NAS message and that is not sent when the mobility management device is overloaded.

\* \* \* \* \*